US010797811B2

(12) United States Patent
Kitazato et al.

(10) Patent No.: US 10,797,811 B2
(45) Date of Patent: Oct. 6, 2020

(54) TRANSMITTING DEVICE AND TRANSMITTING METHOD, AND RECEIVING DEVICE AND RECEIVING METHOD

(71) Applicant: SONY CORPORATION, Tokyo (JP)

(72) Inventors: Naohisa Kitazato, Tokyo (JP); Yoshiharu Dewa, Tokyo (JP)

(73) Assignee: SONY CORPORATION, Tokyo (JP)

(*) Notice: Subject to any disclaimer, the term of this patent is extended or adjusted under 35 U.S.C. 154(b) by 7 days.

(21) Appl. No.: 15/569,644

(22) PCT Filed: May 9, 2016

(86) PCT No.: PCT/JP2016/063756
§ 371 (c)(1),
(2) Date: Oct. 26, 2017

(87) PCT Pub. No.: WO2016/194549
PCT Pub. Date: Dec. 8, 2016

(65) Prior Publication Data
US 2018/0123711 A1 May 3, 2018

(30) Foreign Application Priority Data

Jun. 5, 2015 (JP) ................................ 2015-115160

(51) Int. Cl.
G06F 3/00 (2006.01)
G06F 13/00 (2006.01)
(Continued)

(52) U.S. Cl.
CPC .......... H04H 20/28 (2013.01); H04N 21/235 (2013.01); H04N 21/2362 (2013.01);
(Continued)

(58) Field of Classification Search
CPC ...... H04H 20/28; H04H 60/73; H04N 21/235; H04N 21/2665; H04N 21/462; H04N 21/4722
See application file for complete search history.

(56) References Cited

U.S. PATENT DOCUMENTS

2003/0149983 A1* 8/2003 Markel .................. H04N 7/088
725/51
2005/0154599 A1* 7/2005 Kopra .................... G06Q 30/02
725/106
(Continued)

FOREIGN PATENT DOCUMENTS

JP 2001-359090 A 12/2001
JP 2004-500770 A 1/2004
(Continued)

OTHER PUBLICATIONS

International Search Report dated Aug. 2, 2016 in PCT/JP2016/063756 filed May 9, 2016.
(Continued)

Primary Examiner — Kyu Chae
(74) Attorney, Agent, or Firm — Oblon, McClelland, Maier & Neustadt, L.L.P.

(57) ABSTRACT

Information to be displayed overlaid on a video of a broadcast program is transmitted and received.
At the same time, information related to display data objects which are equal in number to objects to be displayed on a screen is described in one moving object list description document. The information related to the display data object includes a position and a size of the display data object on the screen and the display data or acquisition destination information of the display data. Further, the moving object list description document and the display data of the display data object to be referred to from the moving object list description document are packaged and intermittently trans- (Continued)

mitted as a versatile data stream together with a time stamp indicating a display time of a package unit.

18 Claims, 21 Drawing Sheets

(51) Int. Cl.
    *H04N 5/445*     (2011.01)
    *H04H 20/28*     (2008.01)
    *H04N 21/2665*     (2011.01)
    *H04N 21/4722*     (2011.01)
    *H04N 21/236*     (2011.01)
    *H04N 21/43*     (2011.01)
    *H04N 21/858*     (2011.01)
    *H04N 21/2362*     (2011.01)
    *H04N 21/81*     (2011.01)
    *H04N 21/431*     (2011.01)
    *H04N 21/235*     (2011.01)
    *H04H 60/73*     (2008.01)

(52) U.S. Cl.
    CPC ... *H04N 21/23614* (2013.01); *H04N 21/2665* (2013.01); *H04N 21/4307* (2013.01); *H04N 21/4312* (2013.01); *H04N 21/4722* (2013.01); *H04N 21/8133* (2013.01); *H04N 21/8586* (2013.01); *H04H 60/73* (2013.01)

(56) References Cited

U.S. PATENT DOCUMENTS

| | | | |
|---|---|---|---|
| 2013/0191861 A1* | 7/2013 | Sasaki | H04N 21/236 |
| | | | 725/32 |
| 2013/0205334 A1 | 8/2013 | Kim et al. | |
| 2014/0285716 A1 | 9/2014 | Kondo | |
| 2015/0262376 A1* | 9/2015 | Saboune | G08B 6/00 |
| | | | 386/219 |
| 2016/0353136 A1* | 12/2016 | Lee | H04N 21/43 |
| 2018/0130503 A1* | 5/2018 | Hirajoh | H04N 21/858 |

FOREIGN PATENT DOCUMENTS

| | | |
|---|---|---|
| JP | 2011-259184 A | 12/2011 |
| JP | 2014-200054 A | 10/2014 |
| WO | WO 2013/021643 A1 | 2/2013 |
| WO | 2013/088604 A1 | 6/2013 |

OTHER PUBLICATIONS

Hisayuki Ohmata, "Enhancement of Integrated Broadcast-Broadband System : Toward Advanced Hybridcast Services", NHK Science and Technical Research Laboratories R&D Report, Aug. 2014, No. 146, 38 total pages (with English translation).

Japanese Office Action dated Jun. 25, 2019, in Patent Application No. 2015-115160, 10 pages (with unedited computer generated English translation).

* cited by examiner

FIG. 7

MP TABLE 700

| DATA STRUCTURE | BIT LENGTH | DATA NOTATION |
|---|---|---|
| MMT_Package_Table () { | | |
|     table_id | 8 | uimsbf |
|     version | 8 | uimsbf |
|     length | 16 | uimsbf |
|     reserved | 6 | bslbf |
|     MPT_mode | 2 | bslbf |
|     MMT_package_id_length | 8 | uimsbf |
|     for (i=0; i<N; i++) { | | |
|         MMT_package_id_byte | 8 | uimisbf |
|     } | | |
|     MPT_descriptors_length | 16 | uimsbf |
|     for (i=0; i<N; i++) { | | |
|         MPT_descriptor_byte | 8 | uimsbf |
|     } | | |
|     number_of_assets | 8 | uimsbf |
|     for (i=0; i<N; i++) { | | |
|         identifier_type | 8 | uimsbf |
|         asset_id_scheme | 32 | uimsbf |
|         asset_id_length | 8 | uimsbf |
|         for (i=0; i<N; i++) { | | |
|             asset_id_byte | 8 | uimsbf |
|         } | | |
|         asset_type | 32 | char |
|         reserved | 7 | bslbf |
|         asset_clock_relation_flag | 1 | bslbf |
|         location_count | 8 | uimsbf |
|         for (j=0; j<M; j++) { | | |
|             MMT_general_location_info () | | |
|         } | | |
|         asset_descriptors_length   701 | 16 | uimsbf |
|         for (j=0; j<M; j++) { | | |
|             <u>asset_descriptors_byte</u> | 8 | bslbf |
|         } | | |
|     } | | |
| } | | |

MPU TIME STAMP DESCRIPTOR 800

| DATA STRUCTURE | BIT LENGTH | DATA NOTATION |
|---|---|---|
| MPU_Timestamp_Descriptor() {<br>    descriptor_tag<br>    descriptor_length<br>    for(i=0;i<N;i++){<br>        mpu_sequence_number<br>        mpu_presentation_time<br>    }<br>} | <br>16<br>8<br><br>32<br>64 | <br>uimsbf<br>uimsbf<br><br>uimsbf<br>uimsbf |

FIG. 11

MFU 1100 FOR VERSATILE DATA 

| DATA STRUCTURE | BIT LENGTH | DATA NOTATION |
|---|---|---|
| MFU_data_byte () { | | |
|     component_tag | 16 | uimsbf |
|     data_type_length | 8 | uimsbf |
|     for (i=0; i<N; i++) { | | |
| 1101 →     data_type_char | 8 | char |
|     } | | |
|     additional_info_length | 16 | uimsbf |
|     for (j=0; j<N; j++) { | | |
| 1102 →     additional_info_byte | 8 | uimsbf |
|     } | | |
|     data_length | 32 | uimsbf |
|     for (k=0; k<N; k++) { | | |
| 1103 →     data_byte | 8 | bslbf |
|     } | | |
| } | | |

Rows component_tag through additional_info_byte: VERSATILE DATA HEADER PORTION
Rows data_length through data_byte: DATA PORTION

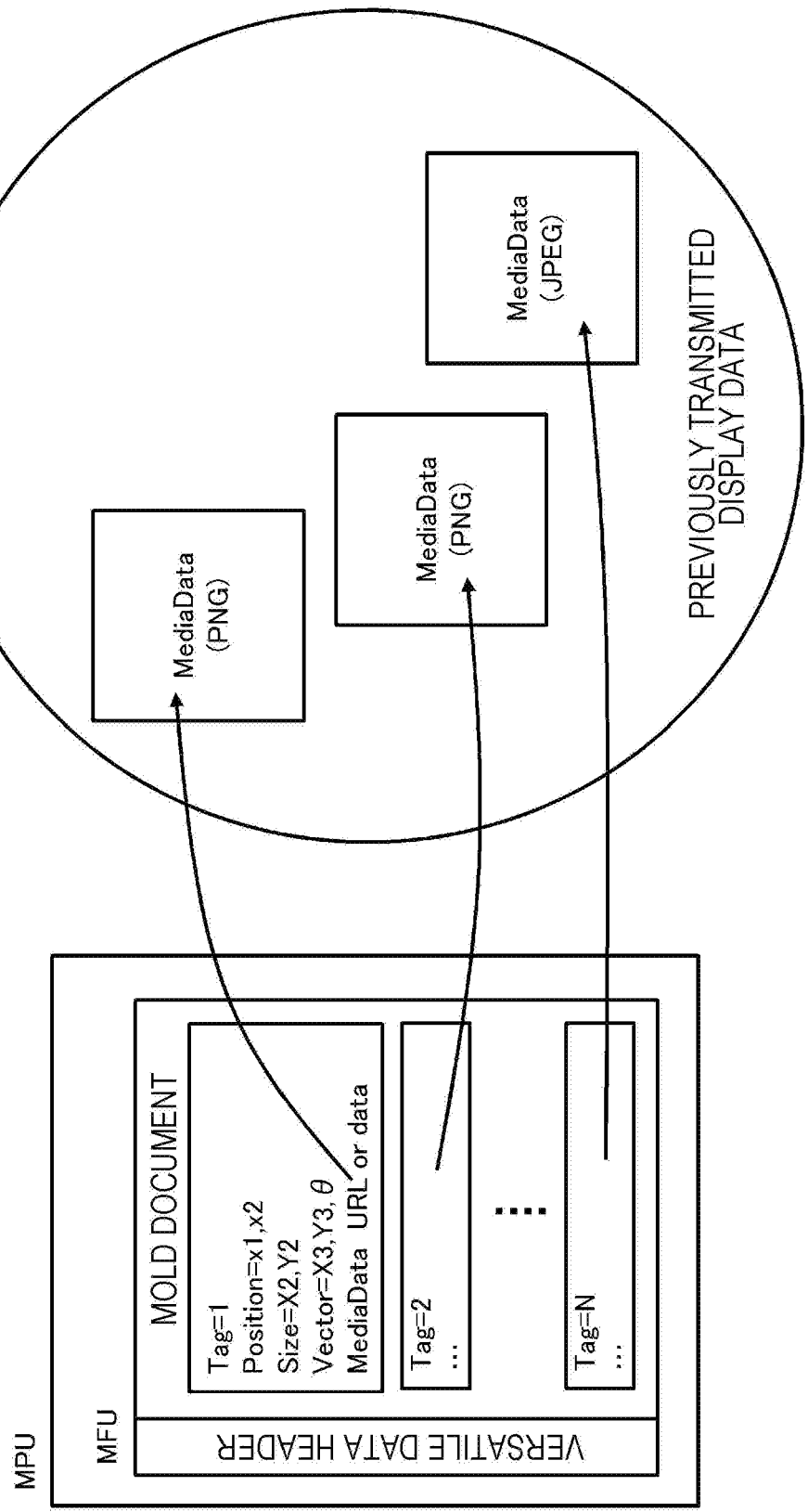

FIG. 16

ADDITIONAL INFORMATION (mold_info) 1600

| DATA STRUCTURE | BIT LENGTH | DATA NOTATION |
|---|---|---|
| mold_info() {<br>    material_location<br>    reserved_future_use<br>    estimated_next_MPU_time<br>} | <br>2<br>6<br>16 | <br>bslbf<br>bslbf<br>bslbf |

FIG. 17

ADDITIONAL INFORMATION (material_info) 1700

| DATA STRUCTURE | BIT LENGTH | DATA NOTATION |
|---|---|---|
| material_info() {<br>    material_name_length<br>    for (i=0; i<N; i++)<br>        material_name_byte<br>    }<br>    persistent_flag<br>    reserved_future_use<br>    if (persistent_flag==1) {<br>        expire_date<br>    }<br>} | <br>8<br><br>8<br><br>1<br>7<br><br>16 | <br>uimsbf<br><br>bslbf<br><br>bslbf<br>bslbf<br><br>bslbf |

FIG. 18

| ELEMENT/ATTRIBUTE | | | | | NUMBER OF APPEARANCES | FORMAT | DESCRIPTION |
|---|---|---|---|---|---|---|---|
| mold | | | | | 1 | | MOVING OBJECT LIST DESCRIPTION |
| | mo | | | | 1..n | | MOVING OBJECT |
| | | @moTag | | | 1 | anyString | MOVING OBJECT TAG |
| | | position | | | 1 | | OBJECT POSITION (UPPER LEFT CORNER OF RECTANGULAR AREA) |
| | | | @x | | 1 | integer | HORIZONTAL COORDINATE |
| | | | @y | | 1 | integer | VERTICAL COORDINATE |
| | | size | | | 0..1 | | OBJECT SIZE |
| | | | @x | | 1 | integer | WIDTH OF OBJECT RECTANGULAR AREA |
| | | | @y | | 1 | integer | HEIGHT OF OBJECT RECTANGULAR AREA |
| | | mv | | | 0..1 | | MOTION VECTOR |
| | | | @x | | 1 | integer | HORIZONTAL DIRECTION VELOCITY |
| | | | @y | | 1 | integer | VERTICAL DIRECTION VELOCITY |
| | | | @θ | | 0..1 | integer | ANGULAR VELOCITY (CASE OF CURVILINEAR MOTION INDICATED BY ARC) |
| | | media | | | 1..n | | MOVING OBJECT DISPLAY DATA |
| | | | @type | | 1 | anyString | DISPLAY DATA TYPE |
| | | | @url | | 0..1 | anyURL | DISPLAY DATA ACQUISITION DESTINATION URL |
| | | link | | | 0..1 | | LINK DESTINATION INFORMATION WHEN OBJECT IS OPERATED |
| | | | @url | | 1 | anyURL | LINK DESTINATION URL |

TRANSMITTING DEVICE AND TRANSMITTING METHOD, AND RECEIVING DEVICE AND RECEIVING METHOD

TECHNICAL FIELD

The technology disclosed in this specification relates to a transmitting device and a transmitting method of transmitting information to be displayed overlaid on a video of a broadcast program and a receiving device and a receiving method of receiving and displaying information to be displayed overlaid on a video of a broadcast program.

BACKGROUND ART

Digital broadcast services employing MPEG2-TS as a media transport scheme are being operated in various countries around the world. Further, in a next-generation digital broadcasting standard, a change from MPEG2-TS to a MPEG media transport (MMT) scheme is under review (for example, see Patent Document 1). In the MMT scheme, it is easy to use different transmission path combinations, and it is possible to use a plurality of broadcast or communication transmission paths in common.

In digital broadcasting, it is possible to transmit a data broadcasting application through a broadcast wave and provide various information linked with an on-air broadcast program through the data broadcasting application. For example, a broadcasting system that broadcasts annotation data to be displayed on a video frame along with video data of a program has been proposed (for example, see Patent Document 2).

Further, a broadcasting system that sets navigation information in which content of a moving image is reflected for each arbitrary section of a broadcast program has been proposed. The navigation information indicates a hyperlink, a button, character information, or the like for other content. For example, in a world travel guide broadcast program, a plurality of pieces of navigation information indicating a menu or a supplementary description including a plurality of buttons corresponding to countries being introduced are set (for example, see Patent Document 3).

CITATION LIST

Patent Document

Patent Document 1: Japanese Patent Application Laid-Open No. 2014-200054
Patent Document 2: Japanese Patent Application National Publication (Laid-Open) No. 2004-500770
Patent Document 3: Japanese Patent Application Laid-Open No. 2001-359090

SUMMARY OF THE INVENTION

Problems to be Solved by the Invention

It is an object of the technology disclosed in this specification to provide a transmitting device and a transmitting method which are excellent and capable of transmitting information to be displayed overlaid on a video of a broadcast program.

It is another object of the technology disclosed in this specification to provide a receiving device and a receiving method which are excellent and capable of receiving and displaying information to be displayed overlaid on a video of a broadcast program.

Solutions to Problems

The technology disclosed in this specification was made in light of the above-mentioned problems, and according to a first aspect of the technology, provided is a transmitting device, including:

a transmitting unit that transmits a broadcast signal including a video; and a data transmitting unit that transmits data for displaying an object moving in synchronization with a motion in the video.

According to a second aspect of the technology disclosed in this specification, the data transmitting unit of the transmitting device according to the first aspect transmits the data including a position and a size of the object on a screen and information related to display data of the object.

According to a third aspect of the technology disclosed in this specification, the data transmitting unit of the transmitting device according to the first aspect intermittently transmits the data together with a time stamp indicating a display time of the data.

According to a fourth aspect of the technology disclosed in this specification, the data transmitting unit of the transmitting device according to the first aspect intermittently transmits the data together with interpolation information for obtaining an interpolation position of the object before a next timing.

According to a fifth aspect of the technology disclosed in this specification, the data transmitting unit of the transmitting device according to the fourth aspect transmits the interpolation information including at least one of velocity vector information and angular velocity information of the object.

According to a sixth aspect of the technology disclosed in this specification, the data transmitting unit of the transmitting device according to the first aspect transmits the data together with link destination information of the object.

According to a seventh aspect of the technology disclosed in the specification, the data transmitting unit of the transmitting device according to the first aspect transmits a document file in which a position and a size of the object on the screen and a reference destination of display data are described in a predetermined format.

According to an eighth aspect of the technology disclosed in this specification, the data transmitting unit of the transmitting device according to the seventh aspect packages the document file and a file of the display data to be referred to from the document file and transmits a resulting package in package units.

According to a ninth aspect of the technology disclosed in this specification, the data transmitting unit of the transmitting device according to the eighth aspect designates whether or not it is necessary to retain each piece of display data included in the package and a retention period, and transmits the package.

According to a tenth aspect of the technology disclosed in this specification, the data transmitting unit of the transmitting device according to the ninth aspect further transmits the document file that refers to a file of display data which is packaged together with another document file and transmitted.

Further, according to an eleventh aspect of the technology disclosed in this specification, provided is a transmitting method, including:

a transmission step of transmitting a broadcast signal including a video; and a data transmission step of transmitting data for displaying an object moving in synchronization with a motion in the video.

Further, according to a twelfth aspect of the technology disclosed in this specification, provided is a receiving device, including:

a receiving unit that receives a broadcast signal including a video;

a data receiving unit that receives data for displaying an object moving in synchronization with a motion in the video; and a control unit that performs a process of displaying the object on a screen of a broadcast video on the basis of the received data.

According to a thirteenth aspect of the technology disclosed in this specification, the data receiving unit of the receiving device according to the twelfth aspect receives the data including a position and a size of the object on the screen and information related to display data of the object, and the control unit causes the display data of the object to be displayed using the position and the size on the screen which are designated by the data.

According to a fourteenth aspect of the technology disclosed in this specification, the data receiving unit of the receiving device according to the twelfth aspect intermittently receives the data together with a time stamp indicating a display time of the data, and the control unit controls a display timing of the object on the basis of the display time designated by the time stamp.

According to a fifteenth aspect of the technology disclosed in this specification, the data receiving unit of the receiving device according to the fourteenth aspect intermittently receives the data together with interpolation information for obtaining an interpolation position of the object before a next timing, and the control unit causes the object to be displayed at the interpolation position obtained on the basis of the interpolation information.

According to a sixteenth aspect of the technology disclosed in this specification, the data receiving unit of the receiving device according to the twelfth aspect receives a document file in which a position and a size of the object on the screen and a reference destination of the display data are described in a predetermined format.

According to a seventeenth aspect of the technology disclosed in this specification, the data receiving unit of the receiving device according to the sixteenth aspect performs reception in units of packages including the document file and a file of the display data to be referred to from the document file.

According to an eighteenth aspect of the technology disclosed in this specification, the data receiving unit of the receiving device according to the seventeenth aspect receives the package in which whether or not it is necessary to retain each piece of display data and a retention period are designated, and the control unit retains the display data until the retention period elapses.

According to a nineteenth aspect of the technology disclosed in this specification, the data receiving unit of the receiving device according to the eighteenth aspect further receives the document file that refers to a file of display data which is packaged together with another document file and transmitted, and the control unit causes the object to be displayed using the display data which is referred to from the document file and packaged with another document file and transmitted.

Further, according to a twentieth aspect of the technology disclosed in this specification, provided is a receiving method, including:

a reception step of receiving a broadcast signal including a video;

a data reception step of receiving data for displaying an object moving in synchronization with a motion in the video; and a control step of performing a process of displaying the object on a screen of a broadcast video on the basis of the received data.

Effects of the Invention

According to the technology disclosed in this specification, it is possible to provide a transmitting device and a transmitting method which are excellent and capable of transmitting display information of an object to be displayed in an overlay manner in accordance with a motion in a video of a broadcast program in temporal synchronization with the video.

Further, according to the technology disclosed in this specification, it is possible to provide a receiving device and a receiving method which are excellent and capable of receiving display information of an object in temporal synchronization with a broadcast signal and displaying the object in accordance with a motion in the video in an overlay manner.

Further, the effects described in this specification are merely examples, and the effect of the present invention is not limited thereto. Further, in addition to the above effects, the present invention may further have additional effects.

Other objects, features, and advantages of the technology disclosed in this specification will become apparent from detailed description based on an embodiment to be described later and the accompanying drawings.

BRIEF DESCRIPTION OF DRAWINGS

FIG. 7 is a diagram illustrating a syntax example 700 of an MP table.

FIG. 11 is a diagram illustrating a syntax example 1100 of an MFU of versatile data.

FIG. 15 is a diagram illustrating a configuration example of an MPU including only an MFU of a moving object list description document without including display data;

FIG. 16 is a diagram illustrating a syntax example 1600 of additional information (mold_info) in an MFU for transmitting a moving object list description document.

FIG. 17 is a diagram illustrating a syntax example 1700 of additional information (material_info) in an MFU for transmitting a material (display data).

FIG. 18 is a diagram illustrating a syntax example 1800 of a moving object list description document.

MODE FOR CARRYING OUT THE INVENTION

Hereinafter, an embodiment of the technology disclosed in this specification will be described in detail with reference to the accompanying drawings.

A. System Configuration

Figure 1:
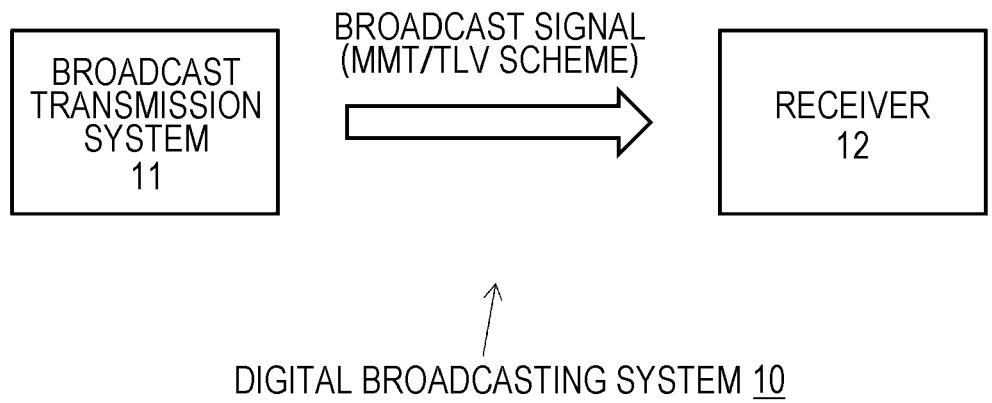
FIG. 1 is a diagram schematically illustrating a configuration example of a digital broadcasting system 10.

FIG. 1 schematically illustrates a configuration example of a digital broadcasting system 10. The illustrated digital broadcasting system 10 includes a broadcast transmission system 11 and a receiver 12.

The broadcast transmission system 11 applies the MMT scheme to transmission of the broadcast signal, converts components constituting a broadcast service into Internet protocol (IP) packets, and transmits the IP packets. Specifically, the broadcast transmission system 11 generates an MMT Protocol (MMTP) packet by including symbols of a video signal and an audio signal of a broadcast program and signals of content (a data broadcasting application or the like) or subtitles associated with the broadcast program in an MMTP payload, transforms it into an IP packet, and transmits the IP packet in a type length value (TLV) packet format through a broadcast transmission path. Here, a component related to a broadcast program body such as a video, an audio, and subtitles is timed media. Further, content, that is, a data broadcasting application encoded in a hypertext transfer protocol (HTML) 5 format or the like is non-timed media.

Further, the broadcast transmission system 11 also performs signaling (notification) of MMT-SI which is control information related to a broadcast service for transmitting timed media and non-timed media. The MMT-SI includes a message, a table, and a descriptor. The table is transmitted using a message as a container. Some parameters indicated by a message or a table are described in a descriptor format.

On the other hand, the receiver 12 receives the TLV packet transmitted from the broadcast transmission system 11 through the broadcast transmission path. Then, the receiver 12 decodes timed transmission media constituting the broadcast program such as the video, the audio, the subtitles, and the like from the received packet and presents images, audios, and subtitles. Further, if data files for data broadcasting are acquired from the received packet, the receiver 12 activates an application engine such as an HTML browser, and causes a data broadcast associated with the broadcast program to be displayed on some or all regions of a screen of displaying a video of a TV program.

Further, the receiver 12 also receives the MMT-SI which is control information related to the broadcast service. The receiver 12 performs reception control of transmission media such as the video, the audio, the subtitles, and the data broadcast and output (display and audio output) control on the receiver 12 on the basis of the MMT-SI.

Figure 2:
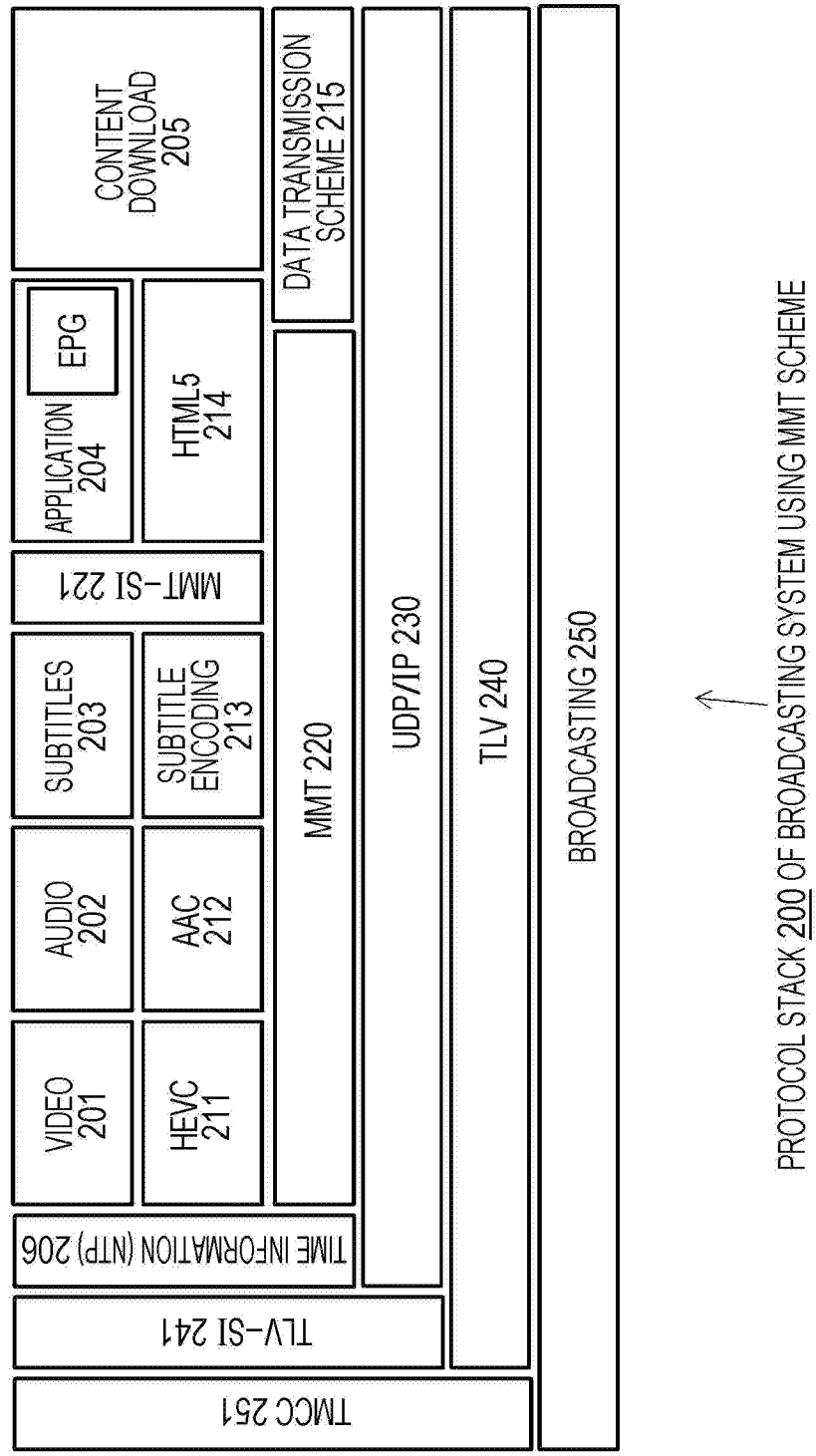
FIG. 2 is a diagram illustrating a protocol stack 200 in a digital broadcasting system 10 using an MMT scheme.

FIG. 2 illustrates a protocol stack 200 in the digital broadcasting system 10 using the MMT scheme.

One broadcast service is configured with components such as a video 201, an audio 202, subtitles 203, an application 204, and content download 205. The video 201 is encoded (211) in a high efficiency video coding (HEVC) format, the audio 202 is encoded (212) in an advanced audio coding (PAC) format, and the subtitles 203 undergoes subtitle encoding (213). Further, the application 204 includes an electric program guide (EPG) and encoded (214) in, for example, an HTML 5 format.

On an MMT layer 220, encoded components 211 and 212 of the video signal and the audio signal of the broadcast program are included in an MMTP payload as a media fragment unit (MFU) and a media processing unit (MPU) and packetized into an MMTP packet. Further, an encoded component 213 of the subtitle signal of the broadcast program and an application (data content) encoded component 214 related to the broadcast program are included in the MMTP payload as the MFU and the MPU and packetized into the MMTP packet. Further, MMT-SI 221 serving as control information (indicating a configuration of the broadcast program or the like) related to the MMT which is a media transport scheme is included in the MMTP payload and packetized into the MMTP packet. The control information MMT-SI related to the MMT will be described in detail later. The MPU is a processing unit, and the MFU is a unit smaller than the MPU. Further, as a data transmission scheme 215 of the content download 205, there are four types, that is, a subtitle/character superimposition transmission scheme, an application transmission scheme, an event message transmission scheme, and a versatile data transmission scheme. Of these, the application transmission scheme is used for a data transmission service which is asynchronous with the broadcast program. Further, the versatile data transmission scheme is a scheme of transmitting various kinds of data in a timed or non-timed manner and can be applied to streaming of data used in players presenting data other than a video, an audio, and subtitles or data used in multimedia services.

In a user datagram protocol (UDP)/IP layer 530, the MMTP packet is packetized into the IP packet. Further, a network time protocol (NTP) packet 206 including information of a current time for timed media is also packetized into an IP packet. Further, the IP packet is packetized into the TLV packet in a TLV layer 240 and transmitted through a broadcast transmission path 250 which is the lowest physical layer. Further, TLV-SI 241 related to a TLV multiplexing format for multiplexing the IP packet is also packetized into the TLV packet and transmitted through the broadcast transmission path 250. A transmission slot in which the TLV packet is multiplexed is specified from a transmission and multiplexing configuration control (TMCC) signal 251 of the transmission path using TLV stream identification information (TLV_stream_id).

Figure 3:
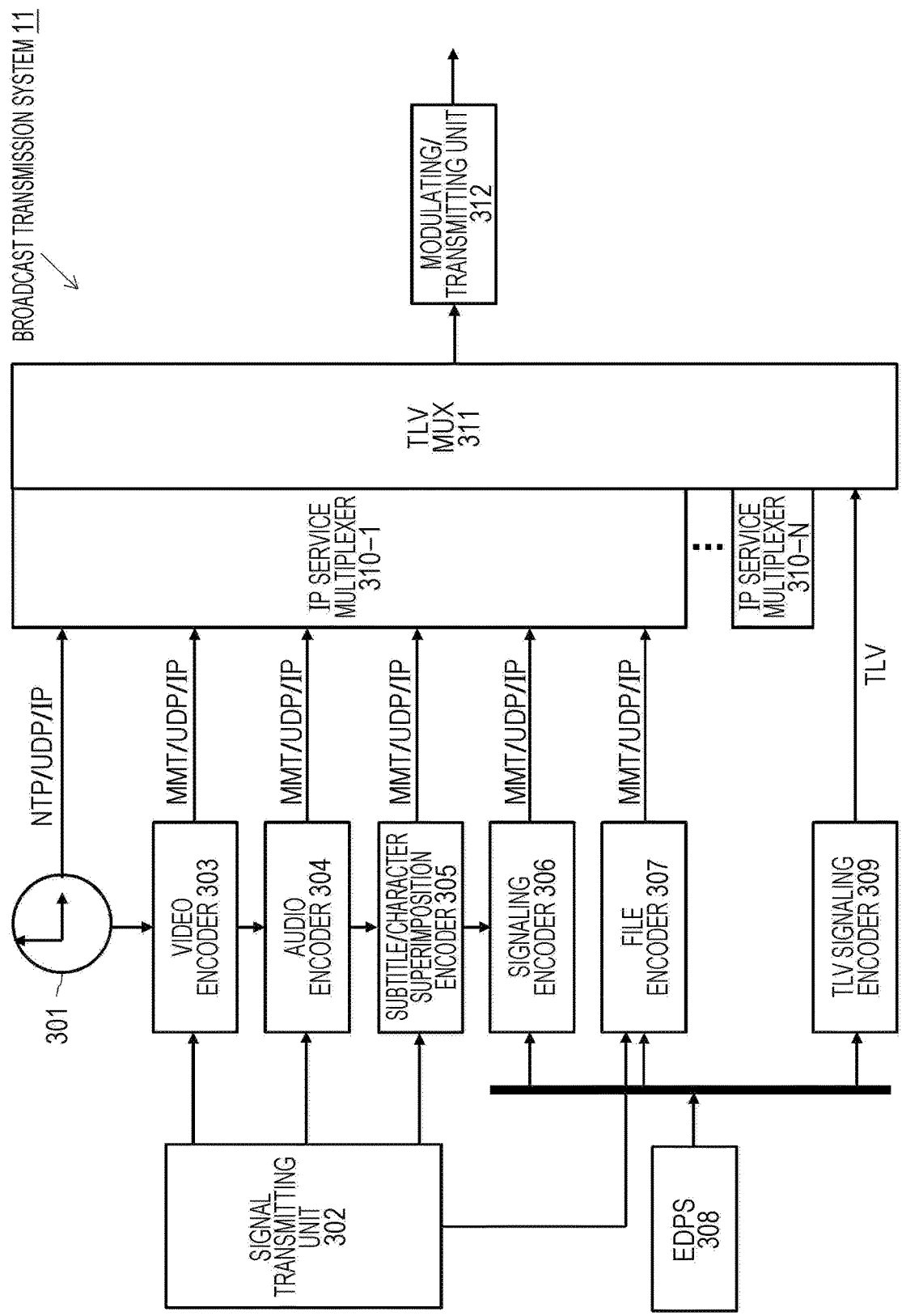
FIG. 3 is a diagram illustrating a configuration example of a broadcast transmission system 11.

FIG. 3 illustrates a configuration example of the broadcast transmission system 11 that transmits the broadcast signal having the protocol stack structure illustrated in FIG. 2. The illustrated broadcast transmission system 11 includes a timepiece unit 301, a signal transmitting unit 302, a video encoder 303, an audio encoder 304, a subtitle/character superimposition encoder 305, a signaling encoder 306, a file encoder 307, an electronic data processing system (EDPS) 308, a TLV signaling encoder 309, an IP service multiplexer (MUX) 310, a TLV multiplexer (MUX) 311, and a modulating/transmitting unit 312.

The timepiece unit 301 generates time information synchronized with time information acquired from an NIP server (not illustrated) and transfers an IP packet including the time information to the IP service multiplexer 310.

The signal transmitting unit 302 is, for example, a recording/reproducing device such as a studio or a VTR of a TV broadcasting station, and transfers stream data such as a video, an audio, subtitles, and a character superimposition which are timed media to the video encoder 303, the audio encoder 304, and the subtitle/character superimposition encoder 305. Further, the signal transmitting unit 302 transfers the data broadcast application which is non-timed media and timed and non-timed versatile data to the file encoder 307.

The electronic data processing system 308 is a scheduler of the TV broadcasting station and functions as a file source. The electronic data processing system 308 transfers the data broadcast application which is non-timed media and the timed and non-timed versatile data to the file encoder 307. Further, the electronic data processing system 308 transfers the control information indicating a configuration of the broadcast service or the like to the signaling encoder 306. Further, the electronic data processing system 308 transfers control information related to multiplexing of the IP packet to the TLV signaling encoder 309.

The video encoder 303 HEVC-encodes a video signal transmitted from the signal transmitting unit 302, further packetizes the resulting video signal, and transfers an IP packet including an MMT packet of the video signal to the IP service multiplexer 310. Further, the audio encoder 304 AAC-encodes an audio signal transferred from the signal transmitting unit 302, further packetizes the resulting audio signal, and transfers an IP packet including an MMT packet of the audio signal to the IP service multiplexer 310. Further, the subtitle/character superimposition encoder 305 encodes a subtitle signal and a character superimposition signal transferred from the signal transmitting unit 302, further generates an MPU in a presentation processing unit, and transmits an IP packet including an MMT packet of the subtitles to the IP service multiplexer 310.

In a case where the broadcast transmission system 11 transmits a plurality of broadcast services, the HEVC encoding of the video signal, the AAC encoding of the audio signal, and the encoding processing for the subtitle/character superimposition are performed for each broadcast service, and the encoded video signal, the encoded audio signal, and the encoded subtitle/character superimposition are transferred to IP service multiplexers 310-1 to 310-N corresponding to the broadcast services #1 to #N.

The signaling encoder 306 generates the control information (MMT-SI) indicating the configuration of the broadcast signal or the like on the basis of the information transferred from the electronic data processing system 308, and transfers an IP packet including an MMT packet in which the MMT-SI is arranged in the payload portion to the IP service multiplexer 310. The MMT-SI includes the message, the table, and the descriptor (described above). The signaling encoder 306 generates the MMT-SI in units of broadcast services and generates the MMT-SI traversing the broadcast service as well.

The file encoder 307 encodes the data broadcast application of the HTML 5 format transmitted from the signal transmitting unit 302 or the electronic data processing system 308 or versatile data used in the data broadcast application or the like, further packetizes it, and transfers an IP packet including the MMT packet to the IP service multiplexer 310.

The broadcast transmission system 11 is equipped with a plurality of IP service multiplexers 310-1 to 310-N for the broadcast services (broadcast channels) #1 to #N to be transmitted. The IP service multiplexer 310 of the channel of each broadcast service multiplexes the IP packets including the video, the audio, the subtitles, the MMT-SI (of the broadcast service unit), the data broadcast application, and the versatile data transferred from the encoders 303 to 307 and generates a TLV packet including the broadcast signal of the broadcast service unit and the MMT-SI traversing the broadcast service.

The TLV signaling encoder 309 generates a TLV packet in which the control information (TLV-SI) relating to multiplexing of the IP packet is arranged in the payload portion on the basis of the information transferred from the electronic data processing system 308.

The TLV multiplexer 311 multiplexes the TLV packets generated by the IP service multiplexers 310-1 to 310-N and the TLV signaling encoder 309 and generates a TLV stream identified by TLV stream identification information.

The modulating/transmitting unit 312 performs an RF modulation process on the TLV stream generated by the TLV multiplexer 311, and transfers the resulting stream to the broadcast transmission path.

An operation of the broadcast transmission system 11 illustrated in FIG. 3 will be described.

The video signal transferred from the signal transmitting unit 302 is supplied to the video encoder 303.

The video encoder 303 HEVC-encodes the video signal, further packetizes the encoded video signal, and generates the IP packet including the MMT packet of the HEVC-encoded video signal. The IP packet is transferred to the IP service multiplexer 310.

Further, a similar process is performed on the audio signal, the subtitles, and the character superimposition signal transferred from the signal transmitting unit 302. In other words, the IP packet including the MMT packet of the AAC-encoded audio signal generated by the audio encoder 304 is transferred to the IP service multiplexer 310, and the IP packet including the MMT packet of the subtitle-encoded signal generated by the subtitle/character superimposition encoder 305 is transferred to the IP service multiplexer 310.

Further, the signaling encoder 306 generates the control information (MMT-SI) indicating the configuration of the broadcast signal or the like on the basis of the information transferred from the electronic data processing system 308, and generates the IP packet including the MMT packet in which the MMT-SI is arranged in the pay load portion. These IP packets are transferred to the IP service multiplexer 310.

Further, the data broadcast application transferred from the signal transmitting unit 302 or the electronic data processing system 308 or the versatile data used in the data broadcast application or the like are supplied to the file encoder 307. The file encoder 307 encodes the data broadcast application of the HTML 5 format or the versatile data, further packetizes it, and generates an IP packet including the MMT packet. The IP packet is transferred to the IP service multiplexer 310.

Each of the IP service multiplexers 310-1 to 310-N multiplexes the IP packets including the video, the audio, the subtitles, the MMT-SI (of the broadcast service unit and traversing the service), the data broadcast application (the HTML 5 document), and the versatile data transferred from the encoders 303 to 307 and generates the TLV packet configuring one channel.

The TLV signaling encoder 309 generates the TLV packet in which the control information (TLV-SI) related to the multiplexing of the IP packet is arranged in the payload portion on the basis of the information transferred from the electronic data processing system 308.

The TLV multiplexer 311 multiplexes the TLV packets generated by the IP service multiplexers 310-1 to 310-N and the TLV signaling encoder 309 and generates the TLV stream. The modulating/transmitting unit 312 performs the RF modulation process on the TLV stream generated by the TLV multiplexer 311, and transmits the RF modulation signal to the broadcast transmission path.

Figure 4:
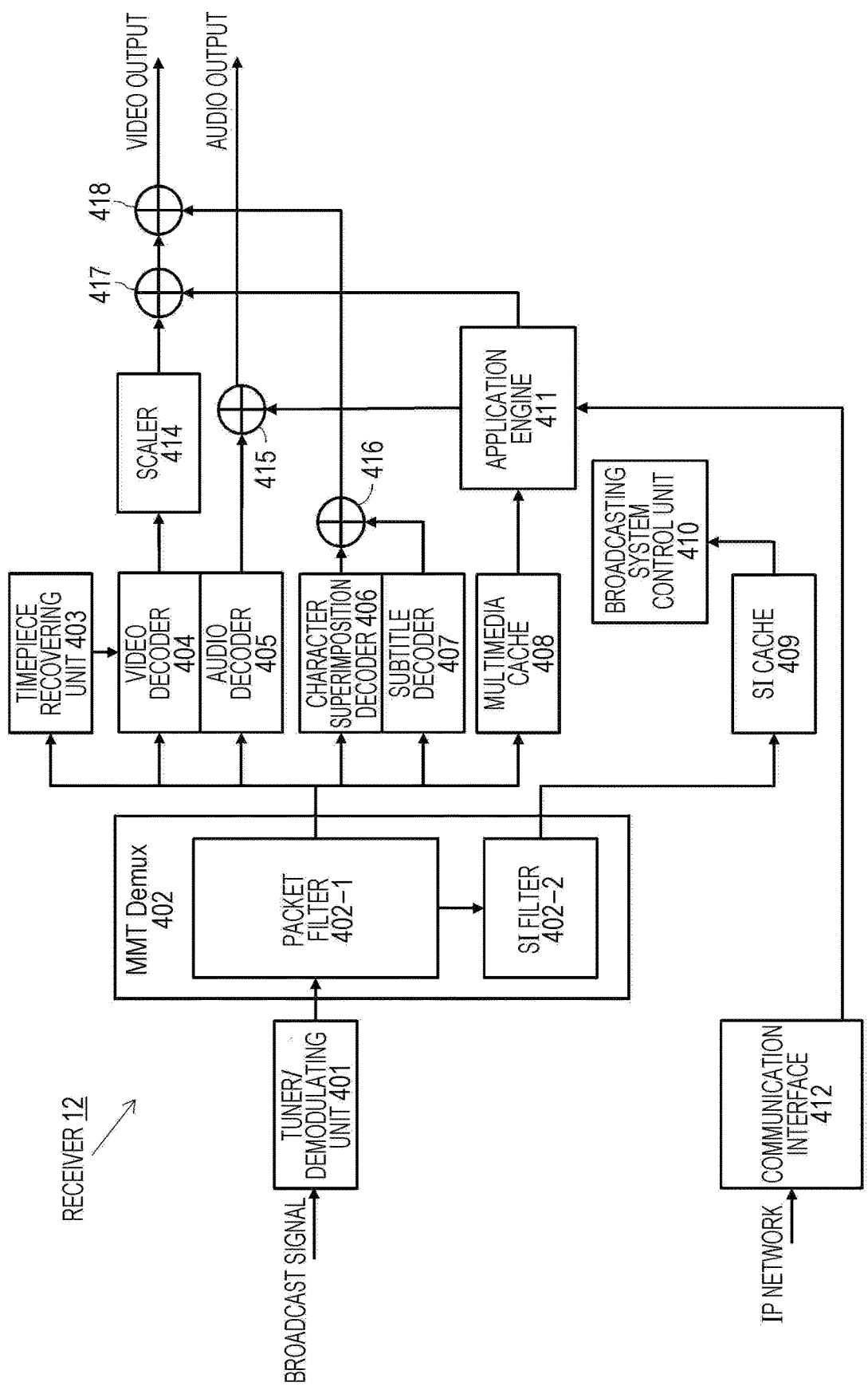
FIG. 4 is a diagram illustrating a configuration example of a receiver 12 that receives a broadcast signal from a broadcast transmission system 11.

FIG. 4 illustrates a configuration example of the receiver 12 that receives the broadcast signal transmitted from the broadcast transmission system 11. The illustrated receiver 12 includes a tuner/demodulating unit 401, an MMT demultiplexer (DEMUR) 402, a timepiece recovering unit 403, a video decoder 404, an audio decoder 405, a character superimposition decoder 406, a subtitle decoder 407, a multimedia (MM) cache 408, a SI cache 409, a broadcasting system control unit 410, an application (App) engine 411, a communication interface (IF) 412, a scaler 414, and synthesizing units 415 to 418.

The tuner/demodulating unit 401 tunes in and receives the broadcast signal, performs a demodulation process, and obtains the TLV stream. The MMT demultiplexer 402 performs a demultiplex process and a de-packetization process on the TLV stream. The demultiplexer 402 includes a packet filter 402-1 and an SI filter 402-2.

The packet filter 402-1 filters the IP packet on the basis of the TLV stream identification information and the IP address, further filters the MMTP packet from the IP packet on the basis of the information in the MMTP header, and distributes the timed transmission media such as the video, the audio, the character superimposition, and the subtitles to the video decoder 404, the audio decoder 405, the character superimposition decoder 406, and the subtitle decoder 407. Further, the packet filter 402-1 distributes the encoded components of the multimedia (data broadcast application) and the versatile data to the multimedia (MM) cache 408. Further, the packet filter 402-1 distributes the MMTP packet including the signaling information to the SI filter 402-2. Further, the SI filter 402-2 filters the signaling information SI and caches the resulting information in the SI cache 410.

The timepiece recovering unit 403 generates time information synchronized with the time information on the basis of the information of the current time included in the NIP packet filtered by the packet filter 402-1 in the MMT demultiplexer 402, and outputs the time information to the video decoder 404, the audio decoder 405, the character superimposition decoder 406, and the subtitle decoder 407 which decode the respective timed transmission media.

The video decoder 404 decodes the encoded video signal obtained by the MMT demultiplexer 402 and obtains a baseband video signal. Further, the audio decoder 405 decodes the encoded audio signal obtained by the MMT demultiplexer 402 and obtains a baseband audio signal. Further, the character superimposition decoder 406 and the subtitle decoder 407 decode the character superimposition and the subtitle-encoded signal obtained by the MMT demultiplexer 402 and obtain character superimposition and subtitle display signals.

The broadcasting system control unit 410 controls a broadcast service reception operation of the entire receiver 12 on the basis of the MMT-SI cached in the SI cache 409. For example, the broadcasting system control unit 410 analyzes execution control information (MH-AIT) of the application included in the MMT-SI, and instructs the application engine 411 to perform a data broadcast presentation process when a data broadcast application instructed to be activated is found.

The application engine 411 is, for example, an HTML browser or the like, and processes the data broadcast application (such as a HTML 5 document) cached in the multimedia cache 408 and generates a display signal and an audio signal of the data broadcast. Further, the application engine 411 is able to acquire a data file necessary for displaying data broadcast (media data used for displaying the data broadcast, an application of a link destination, or the like) from an IP network via the communication interface 412.

Further, in the present embodiment, the versatile data used in the data broadcast application is assumed to be streamed. The application engine 411 acquires the versatile data to be streamed and reflects the versatile data in the display of the application.

The scaler 414 performs a scaling process on the video signal (broadcast video) decoded by the video decoder 404 in accordance with the screen size of the receiver 12.

The synthesizing unit 415 synthesizes the audio signal decoded by the audio decoder 405 with the audio signal for the data broadcast reproduced by the application engine 411 and generates an output audio signal.

The synthesizing unit 416 synthesizes the character superimposition display decoded by the character superimposition decoder 406 with the subtitle display decoded by the subtitle decoder 407. Further, the synthesizing unit 417 synthesizes the broadcast video which has undergone the scaling process performed by the scaler 414 with the display signal of the data broadcast generated by the application engine 411. Further, the synthesizing unit 418 at a subsequent stage synthesizes the broadcast video on which the display of the data broadcast is superimposed with the character superimposition display and the subtitle display output from the synthesizing unit 416, and generates an output video signal.

An operation of the receiver 12 illustrated in FIG. 4 will be described.

The tuner/demodulating unit 401 receives the broadcast signal, performs the demodulation process, and obtains the TLV stream. In the MMT demultiplexer 402, the TLV stream undergoes the demultiplexing process and the packetization process, and the encoded signals of NTP time information, the video, the audio, the character superimposition, the subtitles, the data broadcast application, and the versatile data and signaling information are extracted and distributed to the video decoder 404, the audio decoder 405, the character superimposition decoder 406, the subtitle decoder 407, the multimedia (MM) cache 408, and the SI filter 402-2 through the packet filter 402-1.

Further, the NTP packet extracted by the demultiplexer 402 is distributed to the timepiece recovering unit 403. The timepiece recovering unit 403 generates the time information synchronized with the time information on the basis of the time information included in the NIP packet. In other words, the timepiece recovering unit 403 generates the time information corresponding to the time information generated by the timepiece unit 301 on the broadcast transmission system 11 side. The generated time information is output to the video decoder 404, the audio decoder 405, the character superimposition decoder 406, and the subtitle decoder 407 which decode the respective timed transmission media.

The encoded video signal extracted by the MMT demultiplexer 402 is transferred to the video decoder 404 and decoded, so that the baseband video signal is obtained. The character superimposition-encoded signal extracted by the demultiplexer 402 is transferred to the character superimposition decoder 406 and decoded, so that the character superimposition display signal is obtained. Further, the subtitle-encoded signal extracted by the demultiplexer 402 is transferred to the subtitle decoder 407 and decoded, so that the subtitle display signal is obtained.

The broadcasting system control unit 410 controls an overall reception process performed by the receiver 12 including the process of the data broadcast application on the basis of the MMT-SI received via the SI filter 402-2 and the SI cache 409.

The application engine 411 performs the process of the data broadcast application (such as an HTML 5 document or the like) cached in the multimedia cache 408, and generates the display signal and the audio signal of the data broadcast. Further, in the present embodiment, the versatile data used in the data broadcast application is assumed to be streamed. The application engine 411 reflects the acquired versatile data in the display of the application.

The scaler 414 performs the scaling process of the video signal (broadcast video) decoded by the video decoder 404. Further, the synthesizing unit 416 synthesizes the character superimposition display decoded by the character superimposition decoder 406 with the subtitle display decoded by the subtitle decoder 407. Subsequently, the synthesizing unit 417 synthesizes the broadcast video scaled by the scaler 414 with the display signal of the data broadcast generated by the application engine 411. Further, the synthesizing unit 418 at the subsequent stage synthesizes the broadcast video on which the display of the data broadcast is superimposed with the character superimposition display and the subtitle display outputted from the synthesizing unit 416, and generates the output video signal.

Further, the synthesizing unit 415 synthesizes the audio signal decoded by the audio decoder 405 with the audio signal for the data broadcast reproduced by the application engine 411, and generates the output audio signal.

B. Configuration of Broadcast Signal

Figure 5:
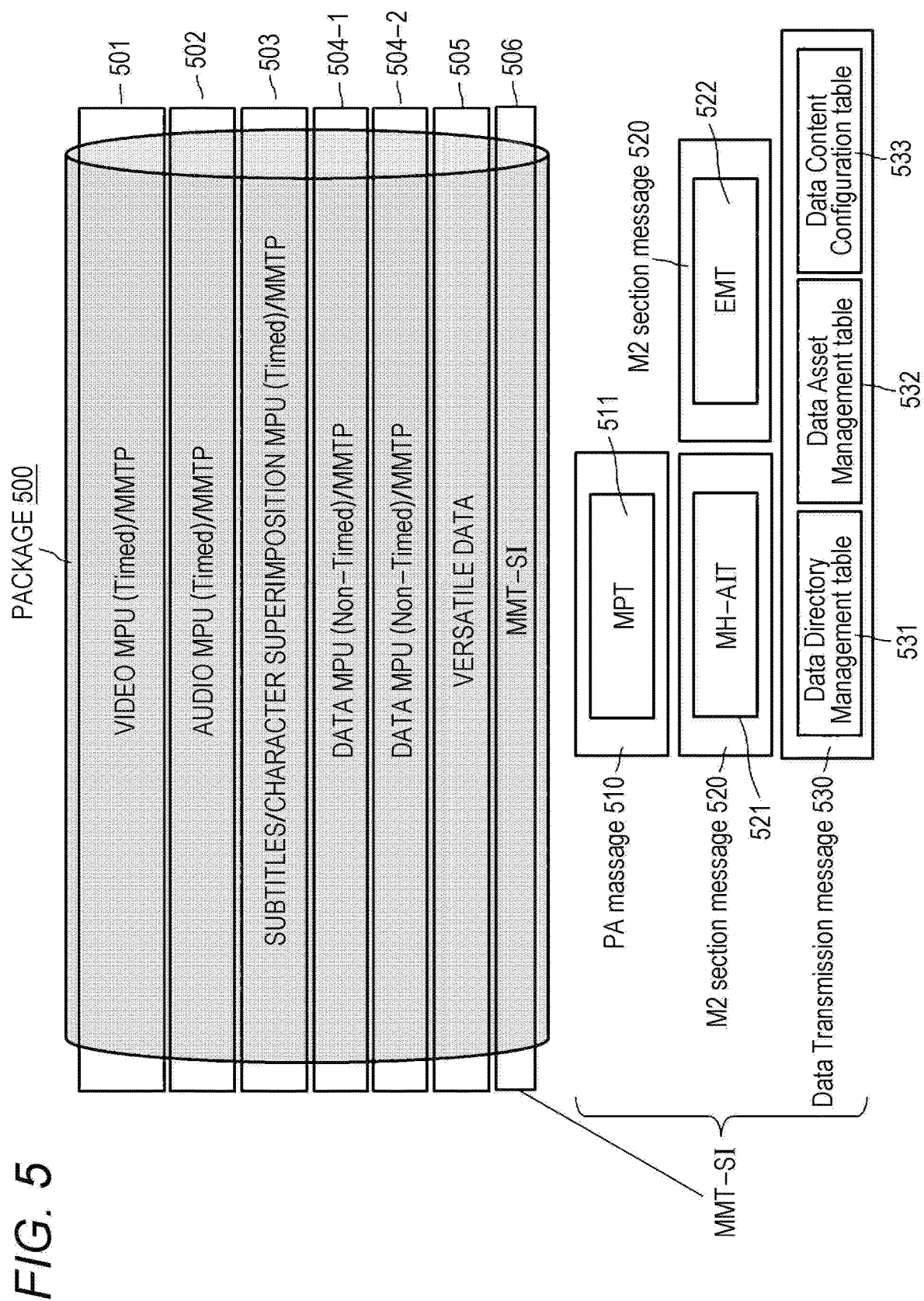
FIG. 5 is a diagram illustrating an image of a broadcast signal 500 transmitted in accordance with an MMT scheme.

FIG. 5 illustrates an image of a broadcast signal 500 to be transferred to the broadcast transmission path from the broadcast transmission system 11 to the receiver 12 in accordance with the MMT scheme.

The broadcast signal is configured with the timed media related to the original version of the broadcast program such as the video, the audio, and the subtitles and the non-timed media such that data broadcast application. In the MMT scheme, it is easy to use the timed media and the non-timed media in different transmission paths combinations. In the example illustrated in FIG. 5, MMT transmission paths 501 to 506 of respective data types such as the video, the audio, the subtitles, the data broadcast application, the versatile data, and the control information (MMT-SI) related to the broadcast service are used for the broadcast signal 500.

In the respective MMT transmission paths, the encoded media data is packetized into the MMTP packet using the MPU format and then transmitted using the IP packet. Each of the MMT transmission paths corresponds to one IP data flow. Here, the IP data flow indicates a set of IP packets in which values of five types of fields including a transmission source IP address, a destination IP addresses, an IP header protocol type, a transmission source port number, and a destination port number of an IP header and a UDP header are identical to one another.

One broadcast service is a package configured with a plurality of components such as the video, the audio, the subtitles, and the data broadcast application (here, one broadcast service corresponds to one channel, that is, one broadcast program). In the MMT transmission scheme, a component is defined as an "asset." Each asset is identified by specific asset identification information (asset_id). The asset identification information uniquely corresponds to a component tag identifying a component (a video asset corresponds to a video component, an audio asset corresponds to an audio component, a subtitle asset corresponds to a subtitle component, and an asset of a data file for the data broadcast application corresponds to a component of the data file).

Each asset is configured with a set of one or more MPUs (a logical group) sharing the same asset identification information. The MPU is a format serving as a transmission unit in the MMT scheme and is configured with one or more MFUs. The MPU is transmitted through an elementary stream (ES) dedicated to each asset, that is, the MMT transmission path. Each MPU is specified by the asset identification information and a sequence number of an MPU on a corresponding transmission path.

In the example illustrated in FIG. 5, the MMTP packet of the encoded video signal configured with an MPU logical group having common asset identification information for the video signal is transmitted in the transmission path 501. Similarly, the MMT packet of the encoded audio signal configured with an MPU logical group having common asset identification information for the audio signal is transmitted in the transmission path 502, the MMTP packet of the encoded subtitle signal and the encoded character superimposition signal configured with an MPU group having common asset identification information for the subtitle signal and the character superimposition is transmitted in the transmission path 503, and the MMTP packet of the encoded application configured with an MPU logical group having common asset identification information for the data broadcast application is transmitted in the transmission paths 504-1 and 504-2. Further, the MMTP packet of the encoded versatile data signal configured with an MPU group having common asset identification information is transmitted in the transmission path 505.

There are cases in which a plurality of assets of the same type are transmitted within one package (broadcast service). In the example illustrated in FIG. 5, assets of two data broadcast applications are allocated different asset identification numbers and transmitted through dedicated ESs, that is, the MMT transmission paths 504-1 and 504-2. For example, an asset of a program-linked data broadcast application which is linked with the broadcast program is transmitted in one MMT transmission path 504-1, and a non-program-linked data broadcast application which is not linked with the broadcast program (for example, a weather forecast, news, or the like) is transmitted in the other MMT transmission path 504-2. The asset of the data broadcast application may be provided independently from each of two or more delivery segments.

Further, in the MMT scheme, it is possible to use a plurality of broadcast or communication transmission paths in common. For example, the non-timed media such as the data broadcast (such as the HTML 5 document) can be transmitted together with the timed media of the same broadcast service using the transmission paths 504-1 or 504-2 of the broadcast signal 500 as illustrated in FIG. 5 and can be transmitted through a communication transmission path (not illustrated) such as an IP network as well.

The transmission path 505 is used to transmit various kinds of data in accordance with the versatile data transmission scheme in the broadcasting system using the MMT. The versatile data transmission can be used for streaming of data for the data broadcast application of the HTML 5 format.

The transmission path 506 is used for signaling in the MMT scheme, that is, transmission of the MMT-SI which is the control information indicating the configuration of the MMT package and information related to the broadcast service. In the transmission path 506, the MMT message including the MMT-SI is packetized into the MMTP packet and repeatedly transmitted in accordance with a carousel scheme. Further, the transmission path for the TLV-SI is not illustrated in FIG. 5.

The MMT-SI includes a message, stable, and a descriptor. As a message transmitted through the transmission path 506, a PA message 510, an M2 section message 520, and a data transmission message 530 may be used.

The PA message 510 is control information indicating the configuration of the broadcast program or the like, and functions as a container that stores an MMT package (MP) table 511 in which information constituting a package such as an asset list or a position thereof is described.

The MMT package (MP) table 511 is a table illustrating basic reception control information of a broadcast service unit, and specifically provides the information constituting the package such as the asset list or location information of the asset. Further, the MP table 511 includes an MPT descriptor such as an application service descriptor. The application service descriptor indicates entry information of the data broadcast application (for example, entry information of the data transmission message or each of the M2 section messages for transmitting an application information table (MH-AIT) and an event message table (EMT)). Further, an MPU time stamp descriptor that provides a presentation time of the MPU is arranged in the MP table 511.

The PA message 510 is an entry point of the broadcast service, and fixed packet identification information (for example, 0x0000) is allocated to the MMTP packet for transmitting the PA message 510. Therefore, the receiver side is able to directly designate fixed packet identification information on the MMT transmission path 506 and acquire the PA message 510. Further, it is possible to indirectly designate assets (the video, the audio, the subtitles, the data broadcast application, and the versatile data) constituting the package (broadcast program) or another signaling message with reference to the MP table 511 transmitted in the PA message 510.

Further, although not illustrated in FIG. 5, a package list (PL) table (PLT) and a layout configuration (LC) table (LCT) may be used as a table stored in PA message 510 in addition to the MP table. The PLT illustrates a list of an IP data flow for transmitting the PA message of the MMT packet supplied as the broadcast service and an IP data flow for transmitting a packet ID and an IP service. Further, the LCT is used to associate layout information for presentation with a layout number. One PA message is a container capable of storing a maximum of three tables such as the MP table, the PL table, and the LC table.

The M2 section message 520 is a message for transmitting a section extension format of MPEG-2 Systems and functions as a container that stores a signaling table of a section format one by one. Table such as a MH-AIT 521 and an EMT 522 are stored in one M2 section message 520 one by one.

The MH-AIT 521 is a table for designating dynamic control information related to an application and additional information necessary for execution. Specifically, in the MH-AIT 521, a method of processing each application serving as a control target of the table during an application information loop is indicated by application_control_code, and various kinds of application information descriptors describing information of an application are arranged. Here, application_control_code indicates an application processing method such as autostart (an automatic start of an application), present (an application executable state), kill (an end of an application), and prefetch (acquisition and retention (prior cache) of an application). Further, a transmission protocol descriptor which is one of the application information descriptors designates a transmission scheme of an application and location information corresponding to the transmission scheme (in the case of HTTP/HTTPS and MMT non-timed transmission, location information is designated by a uniform resource locator (URL) format in common).

The EMT 522 is a signaling table used for an event message transmission scheme and stores information (an event message descriptor) related to an event message (a synchronous/asynchronous message from a broadcasting station to an application on the receiver). The event message transmission scheme provides a means for transferring message information from the broadcasting station to the data broadcast application operating on the receiver immediately or at a designated time.

The data transmission message 530 is a message for transmitting control information related to transmission of the data broadcast application. The data transmission message 530 is a container capable of simultaneously storing a maximum of three tables among a data directory management table (DDMT) 531, a data asset management table (DAMT) 532, and a data content management table (data content configuration table: DCCT) 533. The data directory management table and the data asset management table are essential for the data broadcast service, but the data content management table is optional.

Here, the data directory management table 531 is a table for managing the data broadcast application in directory units (that is, creation units of the data broadcast application). Since a directory structure related to an item (a directory and a sub directory or a file included in a directory) included in one package is described in the same table, it is possible to separate a file configuration of an application and a configuration for file transmission. The same table indicates a correspondence relation between a path name of each node such as a directory or a file and anode tag identifying each node in the data transmission message.

Further, the data asset management table 532 is a table for managing the data broadcast application in asset units, and describes a configuration of an MPU in an asset and version information of each MPU. Specifically, the same table indicates a correspondence relation between a node tag identifying a node (a file or a directory) included in each MPU for transmitting download identification information of each component or a component in the data transmission message and item identification information identifying a node on the MMT transmission path.

Further, the data content management table 533 is a table for managing the data broadcast application for each presentation unit (PU). The same table indicates presentation unit identification information identifying the data broadcast application for each presentation unit and a node tag identifying a node (file or directory) included in each presentation unit in the data transmission message. Further, the same table may include link destination presentation unit identification information identifying the presentation unit linked with the presentation unit or information related to cache control of each presentation unit, and on the receiver side, the same table may be used for flexible and effective cache control of file data for the data broadcast application.

In the transmission scheme of the data broadcast application according to the MMT, it is possible to indicate a data structure of a usage unit such as an application unit or a presentation unit, independently of a transmission data structure of a file unit or a directory structure in content (data broadcast application) creation by using three types of signaling tables 531 to 533 transmitted through the data transmission message. A configuration of each of the signaling tables 531 to 533 is defined in ARIB STD 8-60.

Figure 6:
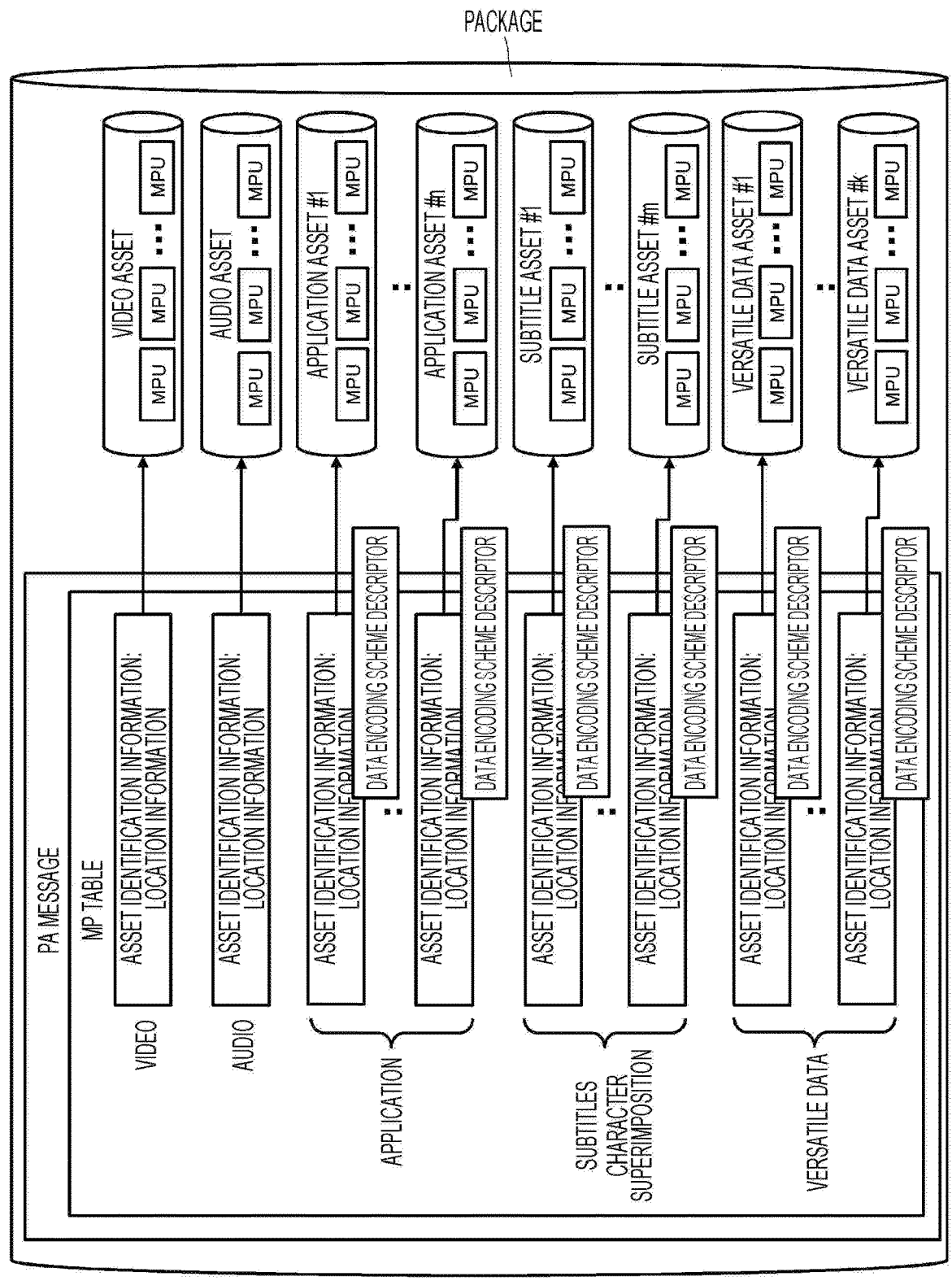
FIG. 6 is a diagram illustrating a mechanism of designating assets associated with a broadcast service from an MP table in a PA message.

As the packet identification information of a message or a table transmitted as the MMT-SI, there are fixed information and information indirectly designated from other tables. Of these, the PA message is the entry point of the broadcast service and allocated the fixed packet identification information (for example, 0x0000). The MP table transmitted in the PA message indicates asset identification information and location information of each asset (the video, the audio, the subtitles, the data broadcast application, and the like) constituting the package (the broadcast program). Therefore, on the receiver side, it is possible to directly designate the fixed packet identification information on the MMT transmission path and acquire the PA message. Further, as illustrated in FIG. 6, it is possible to indirectly designate each asset (the video, the audio, the subtitles, the data broadcast application, and the like) associated with the broadcast service or other signaling messages with reference to the MP table transmitted through the PA message. Further, for the assets except the video and the audio, an MH-data encoding scheme descriptor is arranged in the MP table in order to identify the data encoding scheme.

FIG. 7 illustrates a syntax example 700 of the MP table. Meanings of parameters of the MP table will be described below.

table_id is an 8-bit fixed value (0x20) identifying that the table is the MP table. version is an 8-bit integer value indicating a version number of the MP table. For example, in a case where some parameters (descriptors) constituting the MP table are updated, the version is incremented by +1. length is a parameter having a 32-bit length indicating the size of the MP table counted immediately after this field in byte units. Further, MPT mode indicates an operation when this MP table is divided into subsets.

MMT_package_id_length indicates the size of text information of package identification information (MMT_package_id) in byte units. In a subsequent package identification information loop, MMT_package_id indicates package identification information in byte units (MMT_package_id_byte). The package identification information is identification information of the entire package having assets such as all signals (the video, the audio, and the subtitles) to be transmitted through a broadcast signal (IP data flow) and file data as components. The identification information is text information, and upper 16 bits have the same value as service identification information for identifying a service.

MPT_descriptor_length indicates the size of the MP table descriptor area in byte units. In the MP table descriptor loop, content of the MP table descriptor is described in byte units (MPT_descriptors_byte). Basic information related to reception control of all corresponding broadcast services (packages) is described in the MPT descriptor.

number_of_assets is an 8-bit parameter indicating the number of assets (signals and files) serving as elements constituting the broadcast service (package). Asset information loops are arranged by the number of number_of_asset. Parameters of asset identification information (asset_id) serving as an individual asset, general location information (MMT_general_location_info), and asset descriptor (asset_descriptor) are arranged in one asset information loop. Information to be placed in the loop of asset information will be described below.

identifier_type indicates an ID system of an MMTP packet flow. identifier_type is 0x00 in the case of an ID system indicating asset identification information (asset_id). asset_id_scheme indicates a format of the asset identification information. Asset_id_length indicates the size of text information of the asset identification information in byte units. Ina subsequent asset identification information loop, the asset identification information is indicated in byte units (asset_id_byte).

asset_type indicates a type of asset (the video, the audio, the character superimposition, the subtitles, the application, or the like) using a character string of 32-bit length. asset_clock_relation_flag is a flag indicating the presence or absence of a clock information field of an asset. When the flag is 1, there area clock information identification field (asset_clock_relation_id) and a time scale flag field (asset_timescale_flag), and when the flag is 0, these fields are not present. location_count indicates the number of pieces of location information of an asset, and in the location information loop repeated by the number of subsequent location_count, MMT_general_location_info which is the location information of a corresponding asset is indicated.

asset_type indicates a type of asset (the video, the audio, the character superimposition, the subtitles, the application, or the like) using a character string of 32-bit length. Types of asset indicated by asset_type (character) are shown in Table 1 below.

TABLE 1

| asset_type | Meanings of asset types |
| --- | --- |
| hvc1 | HEVC specified in ITU-T recommendation H.265 |
| mp4a | ISO/IEC 14496-3 audio |
| stpp | Timed text (subtitles/character superimposition) |
| aapp | Application |
| asgd | Timed versatile data |
| aagd | Non-timed versatile data | asset_clock_relation_flag is a flag indicating the presence or absence of a clock information field of an asset. When the flag is 1, there area clock information identification field (asset_clock_relation_id) and a time scale flag field (asset_timescale_flag), and when the flag is 0, these fields are not present. location_count indicates the number of pieces of location information of an asset, and in the location information loop repeated by the number of subsequent location_count, MMT_general_location_info which is the location information of a corresponding asset is indicated. The location information of the asset is described in a format of packet identification information (packet_id: PID) on the MMT transmission path which is an asset acquisition destination. Therefore, it is possible to extract the corresponding packet identification information on the MMT transmission path (IP data flow) by extracting the asset identification information on the MP table (see FIG. 6).

asset_descriptor_length indicates the size of the text information of the asset descriptor (asset_descriptor) in byte units. In an asset descriptor loop indicated by reference numeral 701, content of the descriptor of each asset is indicated in byte units (asset_descriptors_byte). As asset descriptors arranged in the asset information loop (a second loop of the MP table), there are an "MH-data coding scheme descriptor" used to identify a data encoding scheme, an "MPU time stamp descriptor" providing a presentation time of the MPU, an "MPU extension time stamp descriptor" providing a decoding time of an access unit in the MPU or the like, an "asset group descriptor" providing an asset group relation and a priority within the group, an "MPU presentation region designation descriptor" providing a presentation position of the MPU, and a "dependency relation descriptor" providing an asset ID of an asset having a dependency relation.

Figure 8:
FIG. 8 is a diagram illustrating a syntax example 800 of an MPU time stamp descriptor.

FIG. 8 illustrates a syntax example 800 of the MPU time stamp descriptor which is arranged in the asset information loop of the MP table. The MPU time stamp descriptor indicates a presentation time of a first access unit in a presentation order in the MPU. Meanings of parameters of the MPU time stamp descriptor will be described below.

descriptor_tag indicates an 8-bit fixed value identifying a descriptor 800. descriptor_length is an 8-bit area in which a byte length of data of the descriptor is written subsequently to this field.

mpu_sequence_number indicates a sequence number of the MPU describing a time stamp in the descriptor. mpu_presentation_time indicates a presentation time of the MPU indicated by the above-mentioned sequence number in a 64-bit NIP time stamp format.

Figure 9:
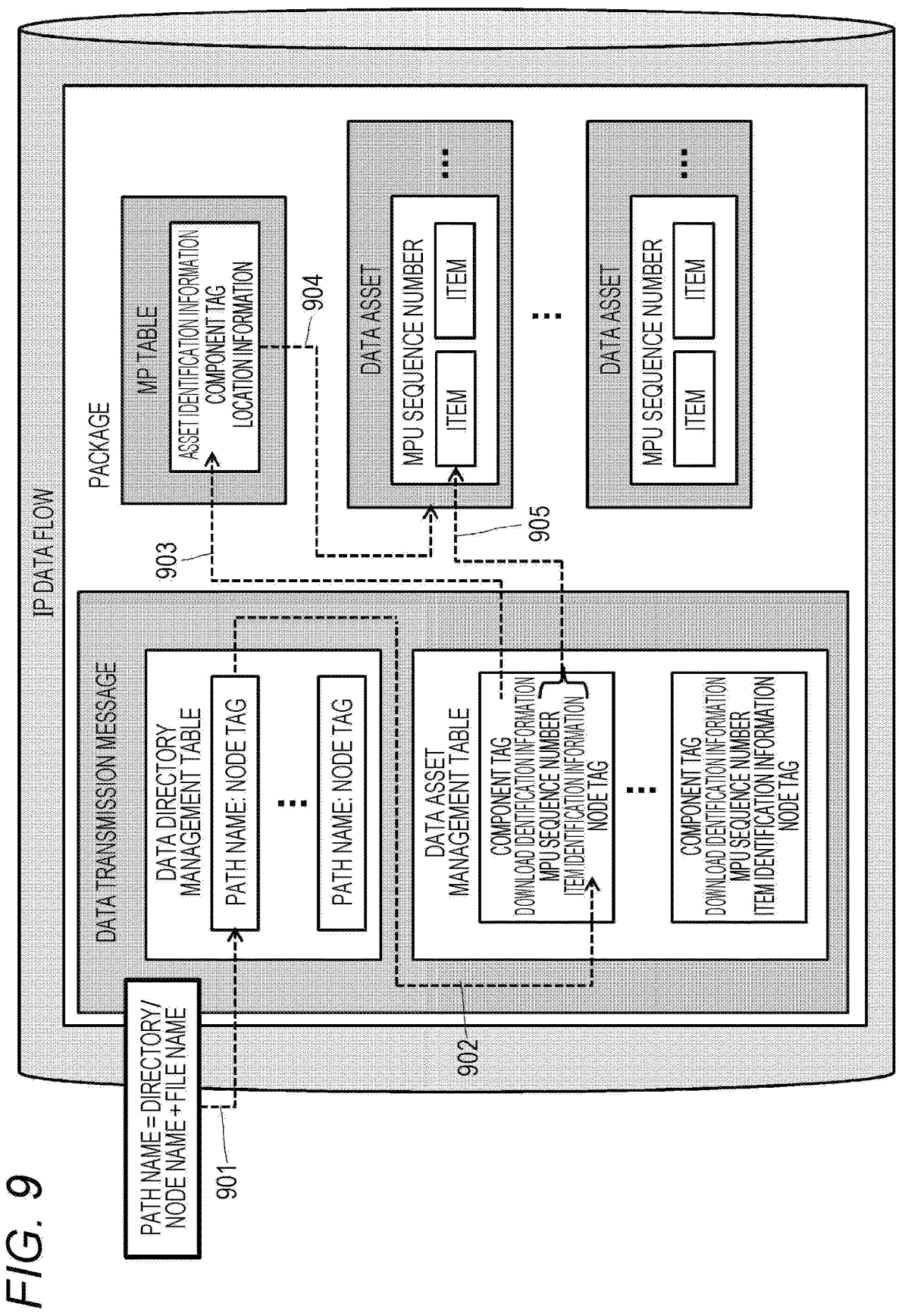
FIG. 9 is a diagram for describing a mechanism of acquiring a file associated with a data broadcast transmitted through an MMT.

In the MH-AIT, the location information of each application is described in a URL format, that is, a path name configured with a combination of a directory/node name and a file name. On the other hand, it is possible to convert a path name of an asset into identification information (packet identification information) on the MMT transmission path using the data directory management table and the data asset management table transmitted through the data transmission message. A mechanism of acquiring a file associated with a data broadcast transmitted in accordance with the MMT will be briefly described with reference to FIG. 9.

The receiver is able to detect an application to be activated (for example, an application whose automatic activation (autostart) is designated by an application control code) with reference to the application information loop in the MH-AIT transmitted through the M2 section message. Further, the receiver is able to acquire the location information of an application, that is, the path name from the transmission protocol descriptor arranged in the MH-AIT.

In the case of an application transmitted through broadcasting, it is possible to acquire a node tag of a file corresponding to a designated path name from the data directory management table in data transmission message as indicated by reference numeral 901.

Then, it is similarly possible to acquire a component tag, download identification information, an MPU sequence number, and item identification information of a data asset in which an item having a node tag obtained by the data directory management table is transmitted from the data asset management table in the data transmission message as indicated by reference numeral 902.

Furthermore, if the location information of an asset having a component tag obtained by the data asset management table is acquired from the MP table as indicated by reference numeral 903, it is possible to specify a data asset in which a corresponding file is actually transmitted as indicated by reference numeral 904.

Further, it is possible to uniquely identify a repetitive transmission unit of a file corresponding to a carousel on the basis of the download identification information obtained from the data asset management table and the download identification information described in the header area of the MMTP packet in which the item is transmitted. It is possible to designate an item having the MPU sequence number and the item identification information obtained from the data asset management table among items which are repetitively transmitted as a desired file as indicated by reference numeral 905.

C. Transmission of Versatile Data Stream

The versatile data transmission scheme is a scheme of transmitting various kinds of data in a timed or non-timed manner and can be applied to streaming of data used in players presenting data other than a video, an audio, and subtitles or data used in multimedia services. The versatile data transmission can be used to transmit various kinds of data used in the data broadcast application of the HTML 5 format as a stream. There are timed versatile data transmitted through a timed MPU and non-timed versatile data transmitted through a non-timed MPU. In the MPU of the timed versatile data, a presentation time is indicated by the MPU time stamp descriptor (described above).

Figure 10:
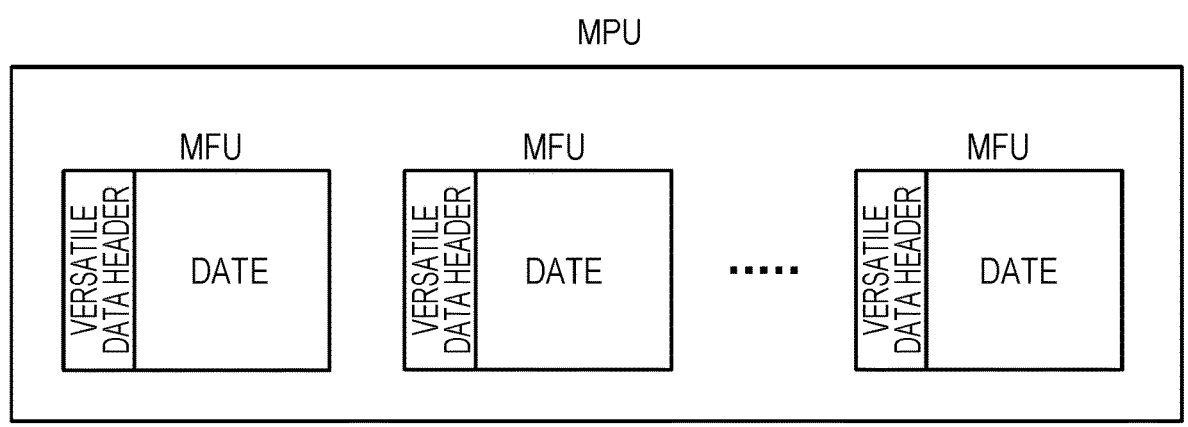
FIG. 10 is a diagram illustrating configurations of an MPU and an MFU of versatile data.

In the versatile data transmission process, the MPU is used as a processing unit. The MPU includes data used at a certain timing and functions as a unit in which processing such as presentation in units of MPUs can be performed. FIG. 10 illustrates configurations of the MPU and the MFU of the versatile data.

The MPU of the versatile data does not include MPU metadata and movie fragment metadata arranged and is configured with one or more MFUs. Each MFU is configured with a versatile data header portion and a data portion. Data of an arbitrary size is able to be stored in the data portion of each MFU. For example, one file can be transmitted through one MFU.

FIG. 11 illustrates a syntax example 1100 of the MFU of the versatile data. Meanings of parameters of the MFU of the versatile data will be described below.

component_tag (component tag) is a label identifying a component stream, and a 16-bit value of a component tag uniquely corresponding to the asset identification information of the versatile data stream to which an MH-stream identification descriptor of the MP table is assigned is written therein.

data_type_length indicates a length of subsequent data type description (data_type_byte) in byte units. data_type_byte indicated by reference numeral 1101 is an area for storing a MULTIPURPOSE Internet mail extension (MIME) type of data to be transmitted through the MFU.

additional_info_length indicates a length of subsequent additional information description in byte units. additional_info_byte indicated by reference numeral 1102 is an area for storing additional information related to data to be transmitted through the MFU.

data_length indicates a length of a data byte of subsequent versatile data in byte units. data_byte indicated by reference numeral 1103 is an area for storing the versatile data.

The component tag, the data type, and the additional information correspond to the versatile data header portion. data_byte corresponds to the data portion.

In this specification, as a versatile data use case, a technology of transmitting data for changing a display object momentarily to the data broadcast application of the HTML 5 format as a versatile data stream is proposed. The technology of transmitting control information for the display object to the data broadcast application of displaying the display object overlaid on the video of the broadcast program as a versatile data stream will be described below in detail as one embodiment of the technology disclosed in this specification.

For example, in a case where the display object synchronized with the video of the broadcast program is displayed, it is possible to transmit the control information for the display object that changes momentarily through the timed versatile data stream temporally synchronized with the video. Further, the data broadcast application is able to display the display object overlaid on the video in accordance with a motion in the video on the basis of the control information received as the versatile data stream.

Figure 12:
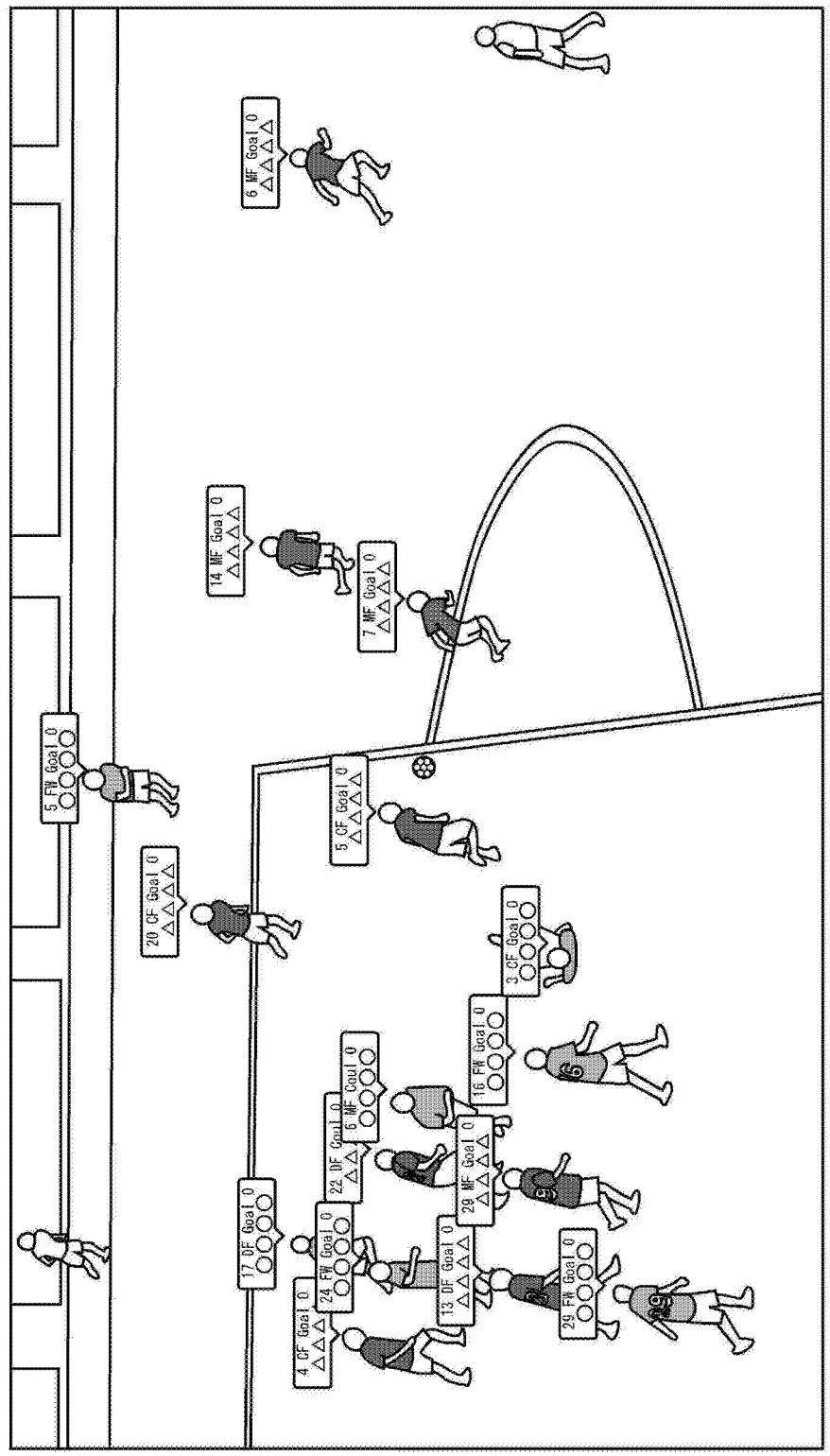
FIG. 12 is a diagram illustrating a display example of a broadcast screen of displaying a display object synchronized with a video of a broadcast program.

FIG. 12 illustrates a display example of a broadcast screen on which the display object synchronized with the video of the broadcast program is displayed. In FIG. 12, a soccer game broadcast screen is illustrated, and "balloon"-like display objects presenting information of players who are playing (for example, a player name, a position, and the number of goals, and the like) are displayed in accordance with motions of the players in an overlay manner.

FIG. 12 is just one example of displaying the display object on the screen of the broadcast program in an overlay manner. A similar display object overlay display can be applied to broadcast programs that relay various events such as baseball, basketball, golf, track and field events, judo, car races, and the like in addition to the soccer. It will be appreciated that a similar display object overlay display can be applied to broadcast programs of various genres such as dramas and music programs in addition to sports.

As a method of indicating information related to the display object synchronized with the video, for example, a moving object list description (MOLD) document to be described below may be used. The moving object list description document has a document structure of describing a list of information related to display objects which are equal in number to objects simultaneously displayed on the screen. Preferably, a position and a size of the display object on the screen and display data or acquisition destination information of the display data (such as a data reference numeral or a URL to be referred to) are described in the moving object list description document as information of each display object.

On a transmission side (broadcasting station), the moving object list description document and the display data (image file) of the display object to be referred to are packaged, and intermittently transmitted as the versatile data stream together with the time stamp indicating the display time of the package unit in a broadcast manner. Further, on the receiver side, if information for rendering each display object is extracted from the moving object list description document, it is possible to display the display object synchronized with the video on the screen of the broadcast program in an overlay manner on the basis of the display time designated by the time stamp.

The time stamp information indicating the display time of the package unit may be indicated by the MPU time stamp descriptor providing the presentation time of the MPU. The MPU time stamp descriptor is one of the asset descriptors 701 arranged in the second loop of the MP table. The syntax example of the MPU time stamp descriptor is illustrated in FIG. 8, but it is preferable to designate the sequence number of the MPU for transmitting the moving object list description document using mpu_sequence_number and designate the display time thereof using mpu_presentation_time.

Further, interpolation information for obtaining an interpolation position of each display object before a next timing is also described in the moving object list description document as information related to the display object. The interpolation information includes information for obtaining an interpolation position in time units obtained by subdividing a period of time before a next timing. The transmission of the versatile data stream in units of video frames is not realistic since an information amount is large. The versatile data stream is intermittently transmitted, and on the receiver side, it is possible to cause the display object to be displayed at the interpolation position obtained on the basis of the interpolation information described in the moving object list description document and move the display object smoothly during a period of time before a next timing. In the display example of the broadcast program illustrated in FIG. 12, it is possible to display the display object in the overlay manner through the interpolation so that the display object follows the soccer player who continuously moves around on the pitch.

For example, it is possible to perform a linear interpolation of the interpolation position of the display object by describing velocity vector information of the display object as the interpolation information. Further, it is possible to perform an arch curve interpolation of the interpolation position of the display object by including the angular velocity information. The velocity vector and the angular velocity can be obtained by analyzing the motion of a corresponding player.

Further, URL information of a hyperlink may be described in the moving object list description document as information related to the display object. On the receiver side, in a case where a video viewer operates the display object, it is possible to acquire information from a link destination designated on the basis of the URL designated for the display object and display the acquired information.

Further, instead of packaging the display data of the display object which is commonly referred to from a plurality of moving object list description documents with the moving object list description document each time and then transmitting the resulting data, and the display data of the display object may be representatively packaged with a first moving object list description document and then transmitted, and then it may be commonly referred to from the moving object list description documents to be transmitted thereafter. It is possible to reduce the transmission information amount (that is, save the transmission band) by transmitting the versatile data configured only with the moving object list description document that refers to external display data. When the display data is updated, if the display data is packaged with the moving object list description document and transmitted, the effect of saving the bandwidth is increased. However, in order to enable the receiver tuned in the middle of a program to display the display object, it is preferable to transmit the versatile data in which the display data is packaged at regular intervals.

Further, the versatile data stream may be intermittently transmitted with a constant period, or the transmission period may be variably controlled. For example, a transmission period of the versatile data stream may be controlled in accordance with the motion of the display object. For example, in a case where the motion of the display object is fast, it is possible to perform the transmission at intervals of 1 second and easily obtain a more accurate interpolation position of the display object. Conversely, in a case where the motion of the display object is slow, the transmission may be performed at intervals of 5 seconds so that the transmission information amount is reduced (that is, the transmission band is saved).

Figure 13:
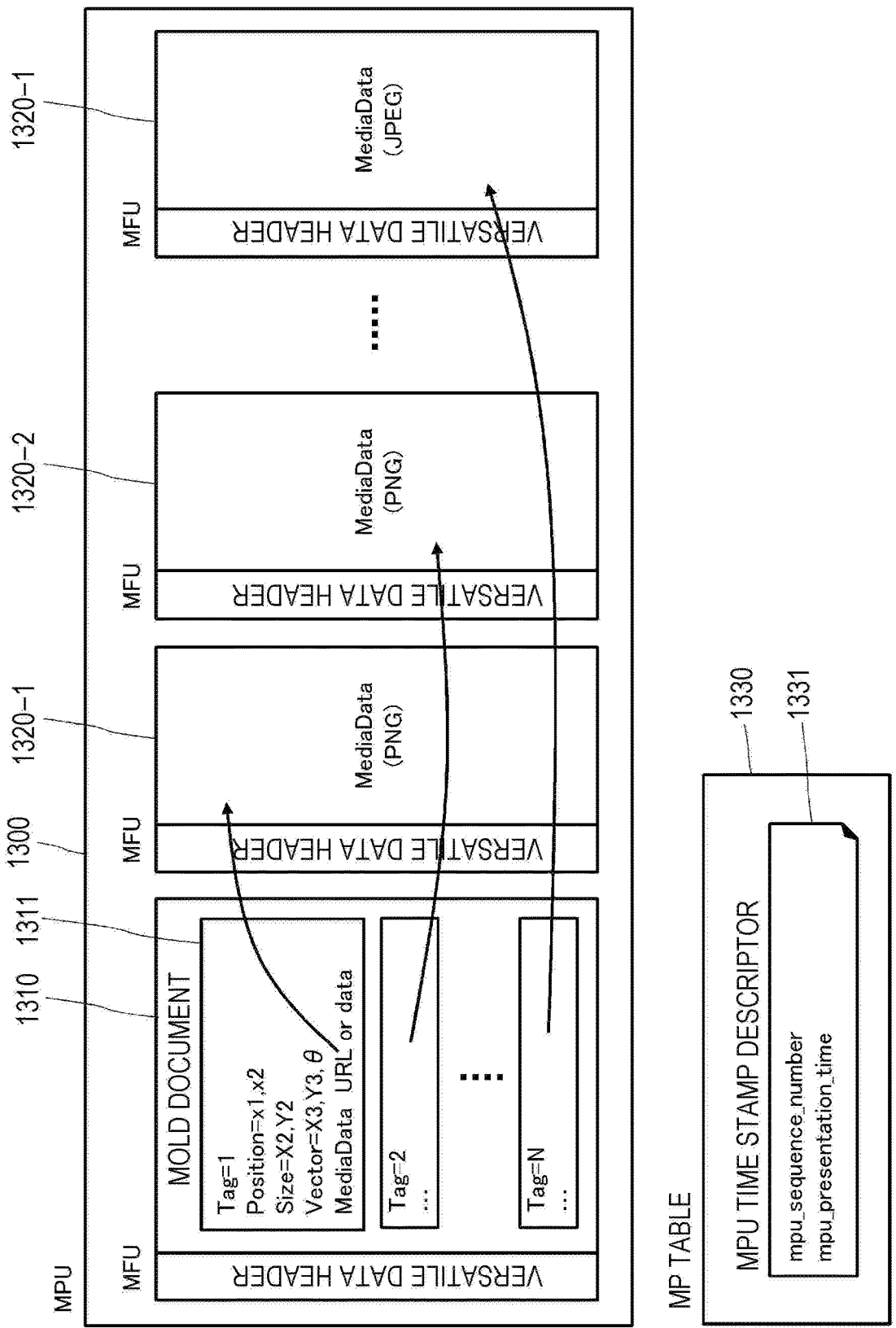
FIG. 13 is a diagram illustrating a configuration example of an MPU for transmitting a versatile data stream in which a moving object list description document and display data are packaged.

FIG. 13 schematically illustrates structures of the moving object list description document in which information related to the display objects which are equal in number to objects is described and the versatile data stream obtained by packaging the display data to be referred to from the same document.

The versatile data stream is transmitted as a timed MPU. As described above with reference to FIG. 10, in the versatile data transmission process, the MPU serves as a processing unit, and the MPU is configured with a plurality of MFUs. In a case where the information related to the display object is transmitted through the versatile data, the package of the moving object list description document and the display data to be referred to from the same document is transmitted through one MPU as a processing unit.

In FIG. 13, reference numeral 1300 indicates an MPU for transmitting one package, and the moving object list description document is stored in a first MFU indicated by reference numeral 1310, and the display data (image file) of the display objects referred to from the moving object list description document is stored in subsequent MFUs 1320-1 to 1320-N.

Figure 14:
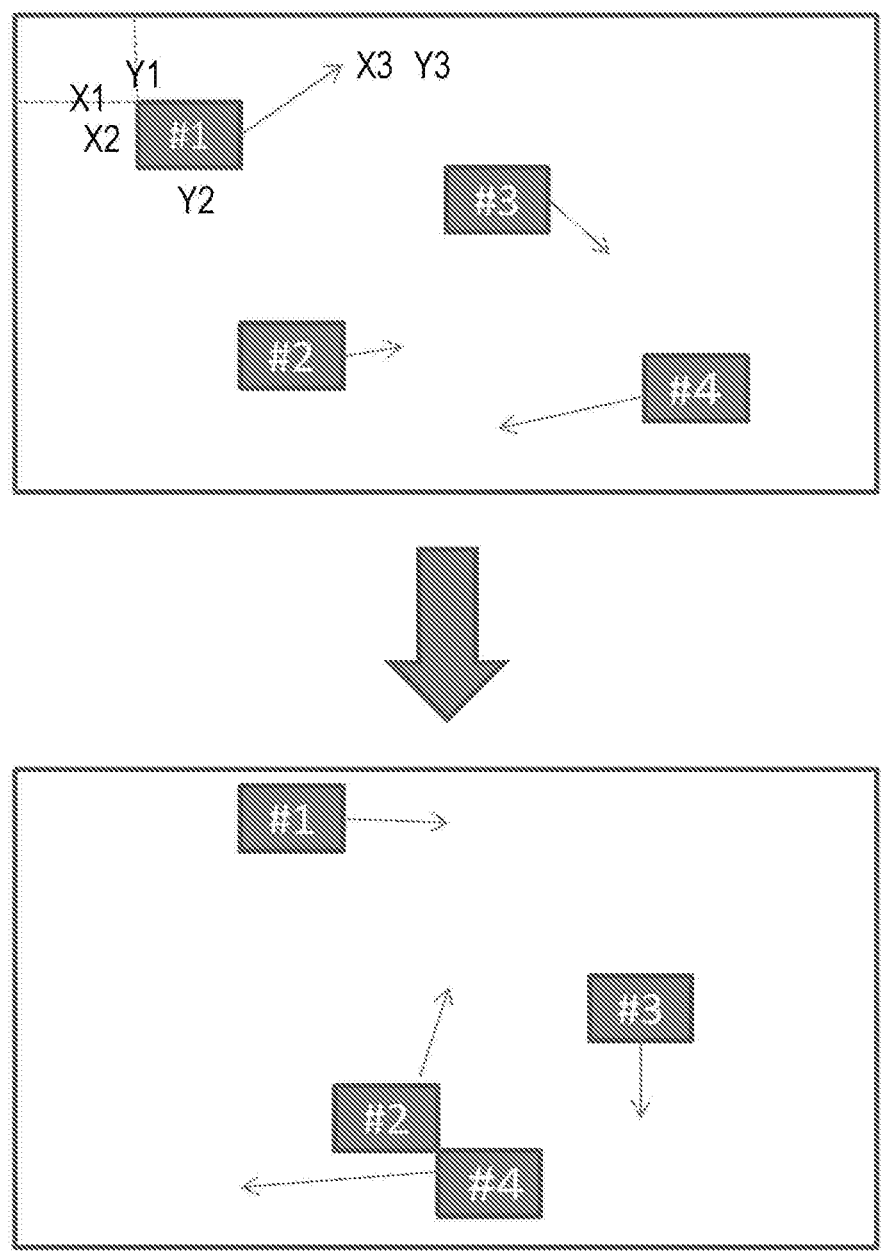
FIG. 14 is a diagram illustrating a display example of a display object described by the moving object list description document illustrated in FIG. 13.

The moving object list description document stored in the data portion of the first MFU 1310 includes a list of information of display objects which are equal in number to N objects displayed on the screen. As illustrated in FIG. 14, in a case where four display objects #1 to #4 are simultaneously displayed on the screen, N=4, and the moving object list description document lists information related to four display objects.

In the moving object list description document, tag information (Tag) identifying the display object, a position and a size for displaying the display object on the screen, the velocity vector information serving as the interpolation information (vector), the angular velocity information (θ), and information (MediaData) of the display data of the display object are included in an information block indicated by reference numeral 1311 as information related to the display object #1. As described above, URL information of a hyperlink maybe further included as the information of the display object (not illustrated in FIG. 13). Although not illustrated for the sake of simplicity, it is understood that similar information related to corresponding display objects is described in other information blocks.

The information (MediaData) of the display data of the display object may be indicated by the acquisition destination information of the display data (a data reference numeral, a URL, or the like to be referred to). In an example illustrated in FIG. 13, the display data (image file) of the display object is assumed to be packaged with the moving object list description document, and the acquisition destination information such as the URL is assumed to designate the location information of the MFU storing a corresponding image file transmitted within the same MPU. Alternatively, the display data itself, that is, binary data may be described in the information block of the moving object list description document.

Further, reference numeral 1330 indicates the MP table and designates the asset identification information and the location information of the assets constituting the broadcast signal (the video, the audio, the subtitles, the data broadcast application, or the like). The display time of the MPU 1300 is designated by an MPU time stamp descriptor 1331 arranged in the second loop of the MP table for the asset of the versatile data stream. In other words, the MPU time stamp descriptor 1331 designates the sequence number of the MPU 1300 for transmitting the moving object list description document using mpu_sequence_number and designates the display time thereof using mpu_presentation_time.

FIG. 13 illustrates the configuration example of the MPU in which the moving object list description document and the display data to be referred to from the same document are packaged and transmitted, and the display data (image file) of each display object is transmitted in a subsequent MFU in the same MPU. As a modified example, an MPU including only the MFU of the moving object list description document without including the display data is also assumed as illustrated in FIG. 15. The moving object list description document refers to the display data transmitted through the MFU included in a preceding MPU. It is possible to reduce the transmission information amount (that is, save the transmission band) through a method of packaging the display data commonly referred to by a plurality of moving object list description documents with only one moving object list description document and transmitting the resulting data. If a mechanism of designating a retention period for the display data is introduced (described later), when an MPU in which the display data is packaged is received, the receiver side is able to cache the display data until the designated retention period expires, and thus it is possible to refer to it from the moving object list description documents transmitted subsequently until the retention period expires. When the display data is updated, it is preferable to transmit the moving object list description document packaged with the updated display data again. However, in order to enable even the receiver tuned in the middle of a program to display the display object, it is preferable to transmit the MPU in which the display data is packaged at regular intervals.

Further, in a case where a similar function is implemented in the broadcasting system of the MPEG TS scheme other than the MMT scheme, similar information may be transmitted through a packetized elementary stream (PES) packet, and the display time may be indicated by a presentation time stamp (PTS).

FIG. 11 illustrates a syntax example 1100 of the MFU of the versatile data. A method of using the parameters of the MFU in a case where it is applied to transmission of the moving object list description document and the display data to be referred to from the same document will be further described below.

data_type_byte indicated by reference numeral 1101 designates a type of data to be transmitted through the MFU using a character string of a data length designated by data_type_length. The MFU in the MPU illustrated in FIG. 13 transmits either of the moving object list description document (MOLD) or the image file of the display data. A type of data designated by a character string of data_type_byte is illustrated in Table 2 below. It is preferable to designate "mld" in the case of the moving list description document, "jpg" in the case of display data of a JPEG format, and "png" in the case of display data of a PNG format using data_type_byte.

TABLE 2

| data_type | Meaning |
| --- | --- |
| mld | Moving object list description document |
| jpg | JPEG image |
| png | PNG image |

Further, additional information according to data stored in the data portion is described in an additional information region (additional_info_byte) indicated by reference numeral 1102. In other words, in the case of the MFU for transmitting the moving object list description document, additional information for the moving object list description document is described. Further, in the case of the MFU for transmitting other data, that is, a material of a display object such as display data, additional information related to the material is described in the additional information region.

The versatile data itself transmitted through the MFU is stored in the data portion (data_byte) indicated by reference numeral 1103. In a case where "mid," that is, the moving object list description document is designated by the preceding parameter data_type_byte, the file of the moving object list description document is stored in the data portion. Further, in a case where "jpg" or "png" is designated by data_type_byte, display data of a JPEG format or a PNG format is stored.

FIG. 16 illustrates a syntax example 1600 of additional information (mold_info) in the MFU for transmitting the moving object list description document. Meanings of parameters of the additional information (mold_info) will be described below.

material_location is a 2-bit field indicating the acquisition destination information of the display data to be referred to from the moving object list description document (stored in the data portion). A meaning indicated by a value of material_location is shown in Table 3 below. In a case where the display data is transmitted through the same MPU as that of the moving object list description document (see FIG. 13), "00" is designated in material_location. Further, in a case where the display data has been transmitted through the previous MPU, 01 is designated in material_location. Further, in a case where the display data is referred to on the Internet, "10" is designated in material_location. In a case where "01" and "10" are designated in material_location, the display data is not packaged into the same MPU as that of the moving object list description document (see FIG. 15), and thus the transmission band is saved. As will be described later, the retention period may be designated in the MFU for transmitting the display data. Therefore, if already transmitted display data is within the retention period, "01" can be designated in material_location.

TABLE 3

| material_location | Meaning |
| --- | --- |
| 00 | Same MPU |
| 01 | Previous MPU (being cached) |
| 10 | Internet | estimated_next_MPU_time indicates a predicted transmission time of a next MPU (for transmitting the moving object list description document). On the receiver side, interpolation is performed at the display position of the display object in view of the predicted transmission time of the next MPU (see FIG. 13).

Further, FIG. 17 illustrates a syntax example 1700 of additional information (material_info) in the MFU for transmitting a material (display data) referred to from the moving object list description document. Meanings of parameter of the additional information (material_info) will be described below.

material_name_length indicates a length of a subsequent material name description (material_name_byte) in byte units. material_name_byte is an area storing a material reference name used when a material transmitted through the data portion of the MFU is referred to from the moving object list description document.

persistent_flag is a data retention flag designating whether or not it is necessary for the receiver to retain display data (a JPEG or PNG image file) stored in the data portion (data_byte) of the MFU even after the process of the MPU ends. Then, in a case where "1" is designated in persistent_flag, the retention period of the display data stored in the data portion of the MFU is described in expire_date field.

The data retention flag and data retention period may be designated in the versatile data header portion for each MFU, that is, for each display data.

On the receiver side, the display data in which "1" is designated in persistent_flag of the versatile data header portion is continuously retained (cached) for the retention period designated by expire_date even after the process of the MPU ends. The retained display data can be referred to (that is, reused) even from the moving object list description document transmitted through a subsequent MPU. In short, in a subsequent MPU, it is not necessary to package the display data to be referred to from the moving object list description document and transmit it through the same MPU, and thus the transmission band can be saved.

FIG. 18 illustrates a syntax example 1800 of the moving object list description document. In a case where "mld" is designated by the parameter data_type_byte in the versatile data header portion of the MFU, the illustrated moving object list description document is stored in the data portion. In FIG. 18, a parameter in which @ is added to the head portion is attribute information, and a parameter in which @ is not added indicates an element. Meanings of parameters will be described below.

mold indicates that the data is the moving object list description document. At the same time, information of a moving object mo is arranged in the document by the number of objects displayed on the screen.

Each moving object mo is identified by an object tag. An object tag serving as an attribute value is described in a moTag field.

As the information of each moving object mo, position information (position) of an object, size information (size) of an object, motion vector information (mv) of an object, information (media) related to display data of an object, and link destination information (link) when an object is operated are included.

The position information (position) of the object includes a horizontal coordinate x and a vertical coordinate y of the display position of the object on the screen (an upper left corner in the case of a rectangular area) as an attribute value, and each pixel position is indicated by an integer value.

The size information (size) of the object includes a width x and a height y of a rectangular area indicating the size of the object to be displayed on the screen, and they are indicated by pixel values (integer values).

The motion vector information (mv) of the object includes a velocity vector configured with a horizontal direction velocity x and a vertical direction velocity y of the object and angular velocity information θ (here, in the case of a curvilinear motion in which a motion of the object is indicated by an arc) as an attribute value, and an integer value indicating each velocity is described. On the receiver side, the motion vector information (mv) may be used to obtain the interpolation position of the object before a timing of a next MPU (that is, a next moving object list description document) (described above).

The information (media) related to the display data indicates a type type (JPEG or PNG) of display data of the object and the acquisition destination information of the display data of the object. The acquisition destination of the display data is roughly classified into the same MPU, the previous MPU, or the Internet and designated by a parameter material_location in the additional information (mold_info) of the versatile data header portion (described above). It is assumed that the acquisition destination information of the display data designates the acquisition destination at the location designated by material_location in a url format, and an image file of a format designated by the type of display data is included in the acquisition destination designated by a url. Further, in a case where "0" is designated as the acquisition destination information of the display data, binary data of the display data may be stored in a display data type area.

The link destination information (link) when the object is operated designates the link destination information of the object in a url format. In a case where the video viewer operates the display object, it is possible to acquire information from the link destination designated by the link destination information (link) and display the information.

Figure 19:
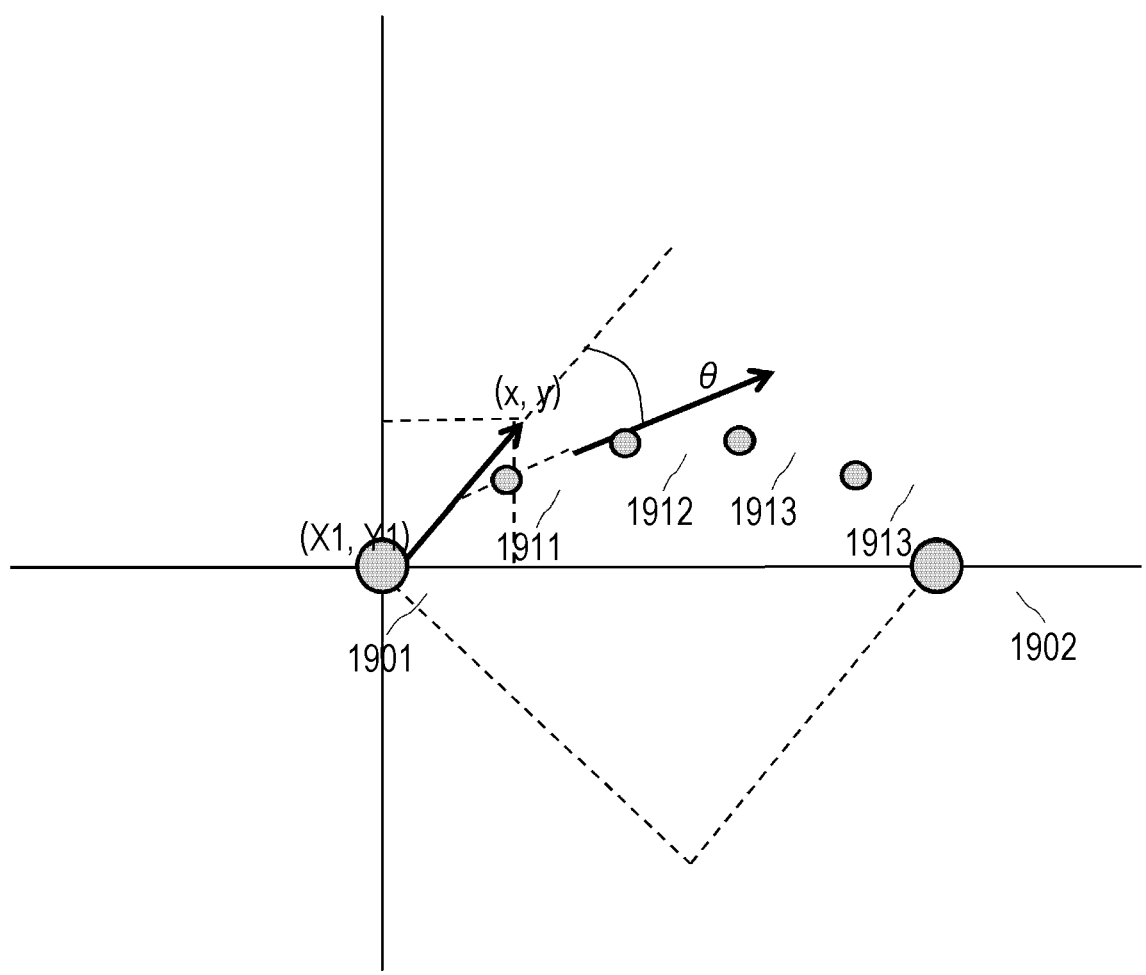
FIG. 19 is a diagram for describing a mechanism of interpolating a display position of a display object on the basis of interpolation information.

FIG. 19 illustrates a mechanism of interpolating the display position of the display object on the basis of the interpolation information designated by the moving object list description document. Reference numeral 1901 indicates a display position (X1, Y1) of the display object designated by a moving object list description document transmitted at a certain timing T1. Further, reference numeral 1902 indicates a display position (X2, Y2) of the same display object designated by a moving object list description document transmitted at a next timing T2. Reference numerals 1911 to 1914 are interpolation positions for timings obtained by subdividing a time interval of a timing. In the moving object list description document transmitted at the timing T1, the velocity vector (x, y) and the angular velocity θ are assumed to be designated as interpolation information for the display object. It is possible to linearly interpolate the interpolation positions 1911, . . . of the subdivided timings on the basis of the velocity vector (x, y), and it is further possible to perform arc curve interpolation on the interpolation positions 1911, . . . on the basis of the angular velocity θ.

The application engine 411 that executes the application of displaying the display object overlaid on the video sequentially acquires the moving object list description document transmitted through the versatile data stream and performs the interpolation on the basis of the interpolation information, and thus it is possible to display the display object smoothly moving on with a motion in the video.

Figure 20:
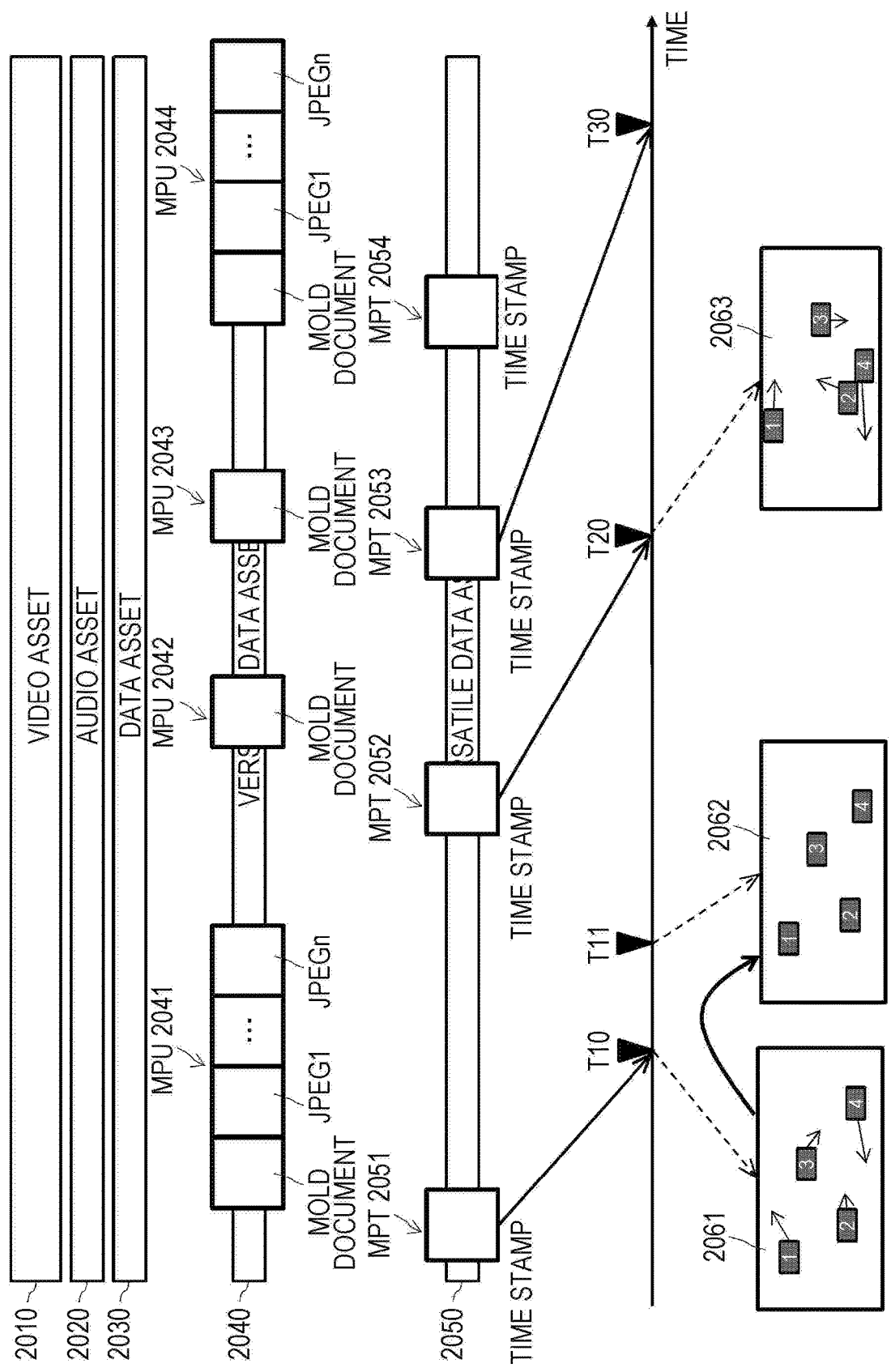
FIG. 20 is a diagram illustrating a scenario of transmitting a moving object list description document through a versatile data stream.

FIG. 20 illustrates a scenario in which the moving object list description document is transmitted through the versatile data stream. In FIG. 20, a broadcast signal transmitted from a certain broadcaster (broadcasting station) is illustrated, and a horizontal axis indicates a time axis. The broadcast signal includes a video asset 2010, an audio asset 2020, a data (application) asset 2030, a versatile data asset 2040 as components constituting the broadcast program. The broadcast signal may further include other assets, but it is omitted for the sake of simplification of the drawing.

Further, the broadcast signal includes a control signal 2050 for transmitting control information (MMT-SI) such as a signaling table such as the MP table, a signaling message serving as a container of the signaling table, or the like.

In FIG. 20, it is assumed that the data broadcast application for displaying the display object overlaid on the video of the broadcast program is transmitted through the data asset 2030, and the control information for the display object, that is, the moving object list description document is intermittently transmitted through in the versatile data asset 2040 as the versatile data stream. Further, the display time of each MPU transmitted through the versatile data asset 2040 is designated by the MPU time stamp descriptor of the MP table (described above).

Reference numeral 2041 indicates an MPU in which the moving object list description document and the display data (image file) of the display object referred to from the moving object list description document are packaged. The moving object list description document is stored in the data portion of the first MFU, and the display data to be referred to from the moving object list description document is stored in each of the second and subsequent MFUs (see FIG. 13).

Further, reference numeral 2042 indicates an MPU in which the display data is not packaged. This MPU transmits only one MFU in which the moving object list description document is stored. The display data already transmitted through the preceding MPU 2041 is referred to from this moving object list description document (see FIG. 15). However, the display data to be referred to is under the assumption that data retention is designated in the versatile data header portion of the MFU by persistent_flag, and the data retention period designated by expire_date does not elapse. Similarly, the MPU indicated by reference numeral 2043 transmits only the MFU of the moving object list description document. It is possible to reduce the transmission information amount (that is, save the transmission band) through a method of packaging the display data commonly referred to by a plurality of moving object list description documents with only one moving object list description document and transmitting the resulting data.

Reference numeral 2044 indicates an MPU in which the moving object list description document and the display data of the display object to be referred to from the moving object list description document are packaged. Similarly to the MPU indicated by reference numeral 2041, the moving object list description document is stored in the data portion of the first MFU, and the display data to be referred to from the moving object list description document is stored in each of the second and subsequent MFUs (same as above).

When the display data is updated, it is preferable to transmit the MPU 2044 including the moving object list description document packaged with the updated display data again. Alternatively, in order to enable the receiver tuned in the middle of a program to display the display object, the MPU 2044 in which the display data is packaged is transmitted after a certain period of time elapses after the MPU 2041 is transmitted.

The MPU time stamp descriptor in the MP table indicated by reference numeral 2051 designates a display time T10 of the display object according to the moving object list description document transmitted through the MPU indicated by reference numeral 2041. Similarly, the MPU time stamp descriptor in the MP table indicated by reference numeral 2052 designates a display time T20 of the MPU indicated by reference numeral 2042, the MPU time stamp descriptor in the MP table indicated by reference numeral 2053 designates a display time T30 of the MPU indicated by reference numeral 2043, and the MPU time stamp descriptor in the MP table indicated by reference numeral 2054 designates a display time of the MPU indicated by reference numeral 2044.

If the MPU 2041 transmitted through the broadcast wave is received, the receiver side analyzes the moving object list description document transmitted at the first MFU and retains the display data transmitted through the second and subsequent MFUs in the header part for the designated retention period.

Further, if the display time T10 designated by the MPU time stamp descriptor of the MP table 2051 comes, the receiver displays the display objects overlaid on the video of the broadcast program in accordance with description content of the moving object list description document received by the MPU 2041 as indicated by reference numeral 2061.

Further, before the display time T20 designated for the next MPU 2042 comes, at a time T11 obtained by subdividing the time interval, the receiver obtains the interpolation position on the basis of the interpolation information (the velocity vector and the angular velocity) designated for each display object in the moving object list description document and updates the display of each display object as indicated by reference numeral 2062.

Thereafter, if the display time T20 designated by the MPU time stamp descriptor of the MP table 2052 comes, the receiver displays the display objects overlaid on the video of the broadcast program with reference to the display data transmitted through the preceding MPU 2041 in accordance with the description content of the moving object list description document received by the MPU 2042 as indicated by reference numeral 2063.

Figure 21:
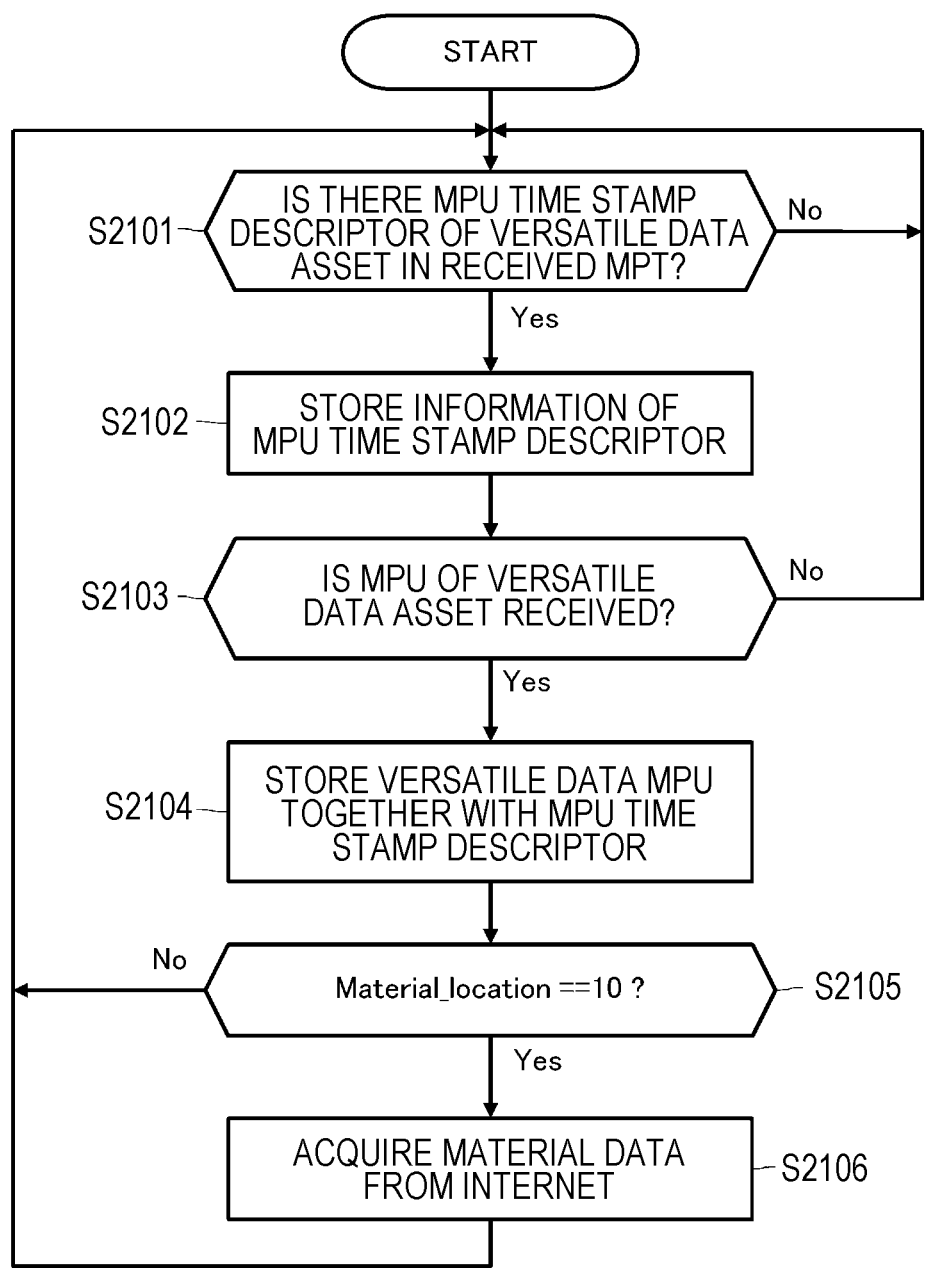
FIG. 21 is a flowchart illustrating a processing procedure when a receiver receives a versatile data stream.

FIG. 21 illustrates a processing procedure when the receiver receives the versatile data stream in a flowchart form. The illustrated processing procedure corresponds to the process of acquiring the versatile data which is received and decoded in the HTML browser (the application engine 411).

Upon receiving the MP table through the PA message which is the entrypoint of the broadcast service, the receiver checks whether or not there is an MPU time stamp descriptor of the versatile data asset (step S2101).

In a case where there is an MPU time stamp descriptor of the versatile data asset (Yes in step S2101), the receiver stores information of the MPU time stamp descriptor, that is, the MPU sequence number and the presentation time thereof (step S2102).

Further, upon receiving the MPU of the versatile data asset (Yes in step S2103), the receiver stores the versatile data MPU together with the information of the MPU time stamp descriptor designating the MPU sequence number (step S2104).

Here, material_location in the versatile data header portion of the first MFU of the MPU (that is, the MFU for transmitting the moving object list description document) is referred to. Further, in a case where material_location="10," that is, in a case where the Internet is designated as the acquisition destination of the display data (Yes in step S2105), the receiver acquires the display data (image file) of each display object on the basis of the URL of the display data acquisition destination designated through the moving object list description document stored in the data portion of the MFU (step S2106).

Figure 22:
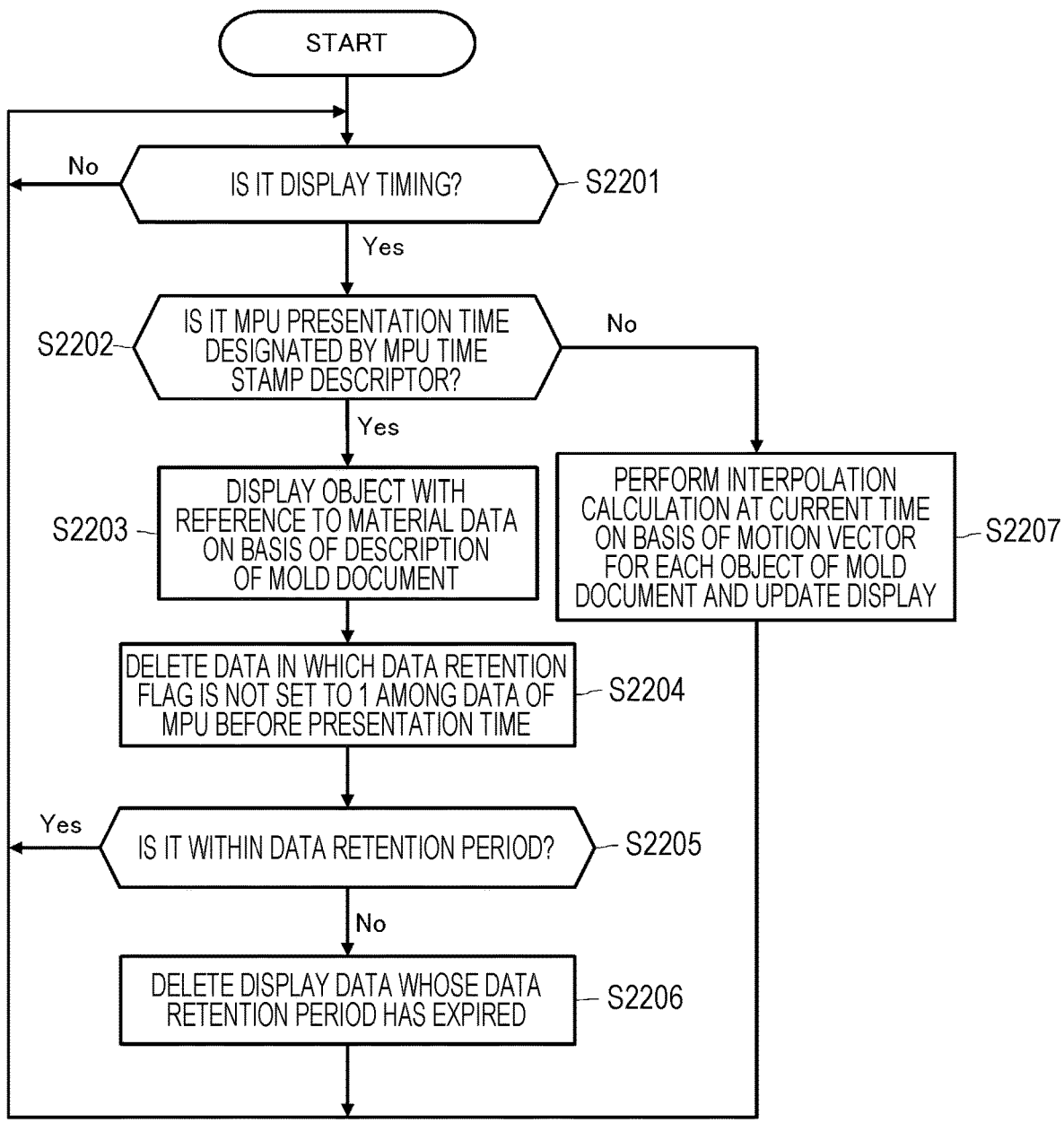
FIG. 22 is a flowchart illustrating a processing procedure in which a receiver displays a display object synchronized with a video in an overlay manner on the basis of a versatile data stream.

Further, FIG. 22 illustrates a processing procedure for displaying the display object synchronous with the video in the overlay manner on the basis of the versatile data stream in a flowchart form. The illustrated processing procedure corresponds to the process of updating the display of the display object on the basis of the latest versatile data in the HTML browser (the application engine 411).

Each time the display timing of the video frame comes (Yes in step S2201), the receiver checks whether or not the display timing coincides with the MPU presentation time designated by the stored MPU time stamp descriptor (step S2202).

Further, in a case where the current display timing is the MPU presentation time designated by the stored MPU time stamp descriptor (Yes in step S2202), the receiver displays the display object overlaid on the video frame with reference to the material data on the basis of the description of the moving object list description document transmitted through the first MFU of the corresponding MPU (step S2203).

Further, the receiver deletes the display data in which the data retention flag (persistent_flag) is not set to 1 among the display data packaged into the MPU received before the MPU of the presentation time (step S2204).

Further, the receiver checks whether or not all pieces of the retained display data are within the retention period (step S2205). Further, in a case where there is display data whose retention period has elapsed, the display data is deleted (step S2206).

Further, in a case where the current display timing is not the MPU presentation time designated by the stored MPU time stamp descriptor (No in step S2202), the receiver calculates the interpolation position at the current time on the basis of the element information of the motion vector (mv) (that is, the velocity vector information and the angular velocity information) for each display object listed in the moving object list description document of the MPU serving as the processing target, and updates the display of the object (step S2207).

INDUSTRIAL APPLICABILITY

The technology disclosed in this specification has been described in detail with reference to the specific embodiment. However, it is obvious that those skilled in the art are able to make modifications or substitutions of the embodiments without departing from the gist of the technology disclosed in this specification.

In this specification, the description has been made focusing on the embodiment in which the technology disclosed in this specification is applied to the broadcasting system employing the MMT scheme for media transmission, but the gist of the technology disclosed in this specification is not limited to this. Similarly, the technology disclosed in this specification can be applied to various types of broadcasting systems equipped with a mechanism that performs streaming on data used in data broadcast applications. For example, in a case where a similar function is implemented in a broadcasting system of an MPEG TS scheme, preferably, similar information is transmitted through a PES packet, and a display time is indicated by a PTS.

In short, the technology disclosed in this specification has been described byway of example, and the description of this specification is not intended to be interpreted restrictively. In order to determine the gist of the technology disclosed in this specification, claims set forth below have to be taken into consideration.

Further, the technology disclosed in this specification may have the following configurations.

(1) A transmitting device, including:
a transmitting unit that transmits a broadcast signal including a video; and
a data transmitting unit that transmits data for displaying an object moving in synchronization with a motion in the video.

(2) The transmitting device according to (1),
in which the data transmitting unit transmits the data including a position and a size of the object on a screen and information related to display data of the object.

(3) The transmitting device according to (1) or (2),
in which the data transmitting unit intermittently transmits the data together with a time stamp indicating a display time of the data.

(4) The transmitting device according to any one of (1) to (3),
in which the data transmitting unit intermittently transmits the data together with interpolation information for obtaining an interpolation position of the object before a next timing.

(5) The transmitting device according to (4),
in which the data transmitting unit transmits the interpolation information including at least one of velocity vector information and angular velocity information of the object.

(6) The transmitting device according to any one of (1) to (5),
in which the data transmitting unit transmits the data together with link destination information of the object.

(7) The transmitting device according to (1),
in which the data transmitting unit transmits a document file in which a position and a size of the object on the screen and a reference destination of display data are described in a predetermined format.

(8) The transmitting device according to (7),
in which the data transmitting unit packages the document file and a file of the display data to be referred to from the document file and transmits a resulting package in package units.

(9) The transmitting device according to (8),
in which the data transmitting unit designates whether or not it is necessary to retain each piece of display data included in the package and a retention period, and transmits the package.

(10) The transmitting device according to (9),
in which the data transmitting unit further transmits the document file that refers to a file of display data which is packaged together with another document file and transmitted.

(11) A transmitting method, including:
a transmission step of transmitting a broadcast signal including a video; and
a data transmission step of transmitting data for displaying an object moving in synchronization with a motion in the video.

(12) A receiving device, including:
a receiving unit that receives a broadcast signal including a video;
a data receiving unit that receives data for displaying an object moving in synchronization with a motion in the video; and
a control unit that performs a process of displaying the object on a screen of a broadcast video on the basis of the received data.

(13) The receiving device according to (12),
in which the data receiving unit receives the data including a position and a size of the object on the screen and information related to display data of the object, and
the control unit causes the display data of the object to be displayed using the position and the size on the screen which are designated by the data.

(14) The receiving device according to (12) or (13),
in which the data receiving unit intermittently receives the data together with a time stamp indicating a display time of the data, and
the control unit controls a display timing of the object on the basis of the display time designated by the time stamp.

(15) The receiving device according to (14),
in which the data receiving unit intermittently receives the data together with interpolation information for obtaining an interpolation position of the object before a next timing, and
the control unit causes the object to be displayed at the interpolation position obtained on the basis of the interpolation information.

(16) The receiving device according to (12),
in which the data receiving unit receives a document file in which a position and a size of the object on the screen and a reference destination of the display data are described in a predetermined format.

(17) The receiving device according to (16),
in which the data receiving unit performs reception in units of packages including the document file and a file of the display data to be referred to from the document file.

(18) The receiving device according to (17),
in which the data receiving unit receives the package in which whether or not it is necessary to retain each piece of display data and a retention period are designated, and
the control unit retains the display data until the retention period elapses.

(19) The receiving device according to (18),
in which the data receiving unit further receives the document file that refers to a file of display data which is packaged together with another document file and transmitted, and
the control unit causes the object to be displayed using the display data which is referred to from the document file and packaged with another document file and transmitted.

(20) A receiving method, including:
a reception step of receiving a broadcast signal including a video;
a data reception step of receiving data for displaying an object moving in synchronization with a motion in the video; and
a control step of performing a process of displaying the object on a screen of a broadcast video on the basis of the received data.

REFERENCE SIGNS LIST

10 Digital broadcasting system
11 Broadcast transmission system
12 Receiver
301 Timepiece unit
302 Signal transmitting unit
303 Video encoder
304 Audio encoder
305 Subtitle/character superimposition encoder
306 Signaling encoder
307 File encoder
308 Electronic data processing system
309 TLV signaling encoder
310 IP service multiplexer
311 TLV multiplexer
312 Modulating/transmitting unit
401 Tuner/demodulating unit
402 MMT demultiplexer
403 Timepiece recovering unit
404 Video decoder
405 Audio decoder
406 Character superimposition decoder
407 Subtitle decoder
408 Multimedia cache
409 SI cache
410 Broadcasting system control unit
411 Application engine
412 Communication interface
414 Scaler
415 to 418 Synthesizing unit

The invention claimed is:

1. A transmitting device, comprising:
a broadcast signal transmitter that transmits a broadcast signal including a video having a moving subject; and
a data transmitter that transmits data for displaying an object moving in synchronization with the motion of the subject in the video, wherein the data for displaying the object includes a time stamp for a time in the video,
wherein the data transmitter analyzes the motion of the subject to obtain interpolation information for determining a moved position of the object to be displayed at a display time chronologically after the time indicated in the time stamp, and
intermittently transmits the data together with the interpolation information.

2. The transmitting device according to claim 1,
wherein the data transmitter transmits the data including a position and a size of the object to be displayed on a screen and information related to display data of the object.

3. The transmitting device according to claim 1,
wherein the data transmitter intermittently transmits the data together with the interpolation information for obtaining a moved position of the object to be displayed at a time in the video before a next time that the data transmitter transmits data.

4. The transmitting device according to claim 3,
wherein the data transmitter transmits the interpolation information including at least one of velocity vector information and angular velocity information of the object to be displayed, and
wherein the moved position of the object is determined based on the at least one of velocity vector information and angular velocity information.

5. The transmitting device according to claim 1,
wherein the data transmitter transmits the data together with link destination information of the object to be displayed.

6. The transmitting device according to claim 1,
wherein the data transmitter transmits a document file in which a position and a size of the object to be displayed on the screen and a reference destination of display data are described in a predetermined format.

7. The transmitting device according to claim 6,
wherein the data transmitter packages the document file and a file of the display data to be referred to from the document file and transmits a resulting package in package units.

8. The transmitting device according to claim 7,
wherein the data transmitter designates whether or not to retain each piece of display data included in the package and a retention period, and transmits the package.

9. The transmitting device according to claim 8,
wherein the data transmitter further transmits a document file that refers to a file of display data which is packaged together with another document file and transmitted.

10. A transmitting method, comprising:
transmitting a broadcast signal including a video having a moving subject; and
transmitting data for displaying an object moving in synchronization with the motion of the subject in the video, wherein the data for displaying the object includes a time stamp for a time in the video,
the method further comprising:
analyzing the motion of the subject to obtain interpolation information for determining a moved position of the object to be displayed at a display time chronologically after the time indicated in the time stamp, and
intermittently transmitting the data together with the interpolation information.

11. A receiving device, comprising:
a broadcast signal receiver that receives a broadcast signal including a video having a moving subject;
a data receiver that intermittently receives data for displaying an object at a time in the video indicated in a time stamp included in the data, the object moving in synchronization with a motion of the moving subject in the video, and receives interpolation information together with the data, the interpolation information is for determining a moved position of the object to be displayed at a display time in the video after the time indicated in the time stamp; and
a controller that performs a process of displaying the object on a screen of a broadcast video at the moved position on the basis of the interpolation information.

12. The receiving device according to claim 11,
wherein the data receiver receives the data including a position and a size of the object to be displayed on the screen and information related to display data of the object, and
the controller causes the display data of the object to be displayed using the position and the size on the screen.

13. The receiving device according to claim 11,
wherein
the controller controls a display time in the video of the displayed object on the basis of the display time designated by the time stamp.

14. The receiving device according to claim 11,
wherein the data receiver receives a document file in which a position and a size of the object to be displayed on the screen and a reference destination of the display data are described in a predetermined format.

15. The receiving device according to claim 14, wherein the data receiver performs reception in units of packages including the document file and a file of the display data to be referred to from the document file.

16. The receiving device according to claim 15, wherein the data receiver receives a package in which whether or not to retain each piece of display data and a retention period are designated, and the controller retains the display data until the retention period elapses.

17. The receiving device according to claim 16, wherein the data receiver further receives a document file that refers to a file of display data which is packaged together with another document file and transmitted, and the controller causes the object to be displayed using the display data which is referred to from the document file and packaged with another document file and transmitted.

18. A receiving method, comprising:

receiving a broadcast signal including a video having a moving subject;

receiving data for displaying an object at a time in the video indicated in a time stamp included in the data, the object moving in synchronization with a motion of the moving subject in the video, and receiving interpolation information together with the data, the interpolation information is for determining a moved position of the object to be displayed at a display time in the video after the time indicated in the time; and performing a process of displaying the object on a screen of a broadcast video at the moved position of the displayed object obtained on the basis of the interpolation information.

* * * * *